United States Patent
Sakaguchi et al.

(10) Patent No.: US 11,260,902 B2
(45) Date of Patent: Mar. 1, 2022

(54) TURNING CONTROL DEVICE

(71) Applicant: NSK LTD., Tokyo (JP)

(72) Inventors: Toru Sakaguchi, Fujisawa (JP);
Tetsuya Kitazume, Maebashi (JP);
Shoya Maruyama, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/289,007

(22) PCT Filed: Oct. 21, 2020

(86) PCT No.: PCT/JP2020/039577
§ 371 (c)(1),
(2) Date: Apr. 27, 2021

(87) PCT Pub. No.: WO2021/106438
PCT Pub. Date: Jun. 3, 2021

(65) Prior Publication Data
US 2021/0387669 A1 Dec. 16, 2021

(30) Foreign Application Priority Data
Nov. 26, 2019 (JP) .................................. 2019-213626

(51) Int. Cl.
*B62D 6/00* (2006.01)
*B62D 15/02* (2006.01)
*B62D 5/04* (2006.01)

(52) U.S. Cl.
CPC .......... *B62D 6/002* (2013.01); *B62D 5/0481* (2013.01); *B62D 6/008* (2013.01); *B62D 15/0215* (2013.01)

(58) Field of Classification Search
CPC ...... B62D 6/002; B62D 5/0481; B62D 6/008; B62D 15/0215
See application file for complete search history.

(56) References Cited

U.S. PATENT DOCUMENTS

2004/0104066 A1   6/2004   Sakai
2009/0105907 A1*  4/2009   Yamaguchi ............ B62D 6/002
                                                    701/41
(Continued)

FOREIGN PATENT DOCUMENTS

JP   2004-130971 A    4/2004
JP   2013-237397 A   11/2013
(Continued)

OTHER PUBLICATIONS

International Search Report for PCT/JP2020/039577, dated Dec. 28, 2020.
Written Opinion for PCT/JP2020/039577, dated Dec. 28, 2020.

*Primary Examiner* — Jason Holloway
(74) *Attorney, Agent, or Firm* — Sughrue Mion, PLLC

(57) ABSTRACT

A turning control device includes: a steering angular displacement calculation unit configured to, when a third steering angle that is either a first steering angle of a turning mechanism or a second steering angle of a steering mechanism, is in an angular range from a maximum angle to a threshold steering angle, calculate a steering angular displacement of the third steering angle with the threshold steering angle used as a reference; a steering angle correction value calculation unit configured to calculate a steering angle correction value according to at least the steering angular displacement; a steering angle correction value limiting unit configured to limit the steering angle correction value according to at least a steering state, the third steering angle, and angular velocity thereof; a corrected target steering angle calculation unit configured to correct the target steering angle of the turning mechanism with a limited steering angle correction value.

10 Claims, 21 Drawing Sheets

(56) References Cited

U.S. PATENT DOCUMENTS

| | | | | |
|---|---|---|---|---|
| 2011/0077834 A1* | 3/2011 | Kudo | .................... | B60T 8/1764 |
| | | | | 701/72 |
| 2014/0343791 A1* | 11/2014 | Suzuki | ................. | B62D 5/0487 |
| | | | | 701/41 |
| 2017/0096163 A1* | 4/2017 | Sakaguchi | ............... | B62D 6/02 |
| 2019/0351936 A1 | 11/2019 | Anraku et al. | | |
| 2020/0010112 A1 | 1/2020 | Toko et al. | | |

FOREIGN PATENT DOCUMENTS

| | | |
|---|---|---|
| JP | 2014-133533 A | 7/2014 |
| JP | 2019-199172 A | 11/2019 |
| JP | 2020-6831 A | 1/2020 |
| WO | 2013/094097 A1 | 6/2013 |
| WO | 2014/038133 A1 | 3/2014 |
| WO | 2014/054253 A1 | 4/2014 |
| WO | 2019/193976 A1 | 10/2019 |

* cited by examiner

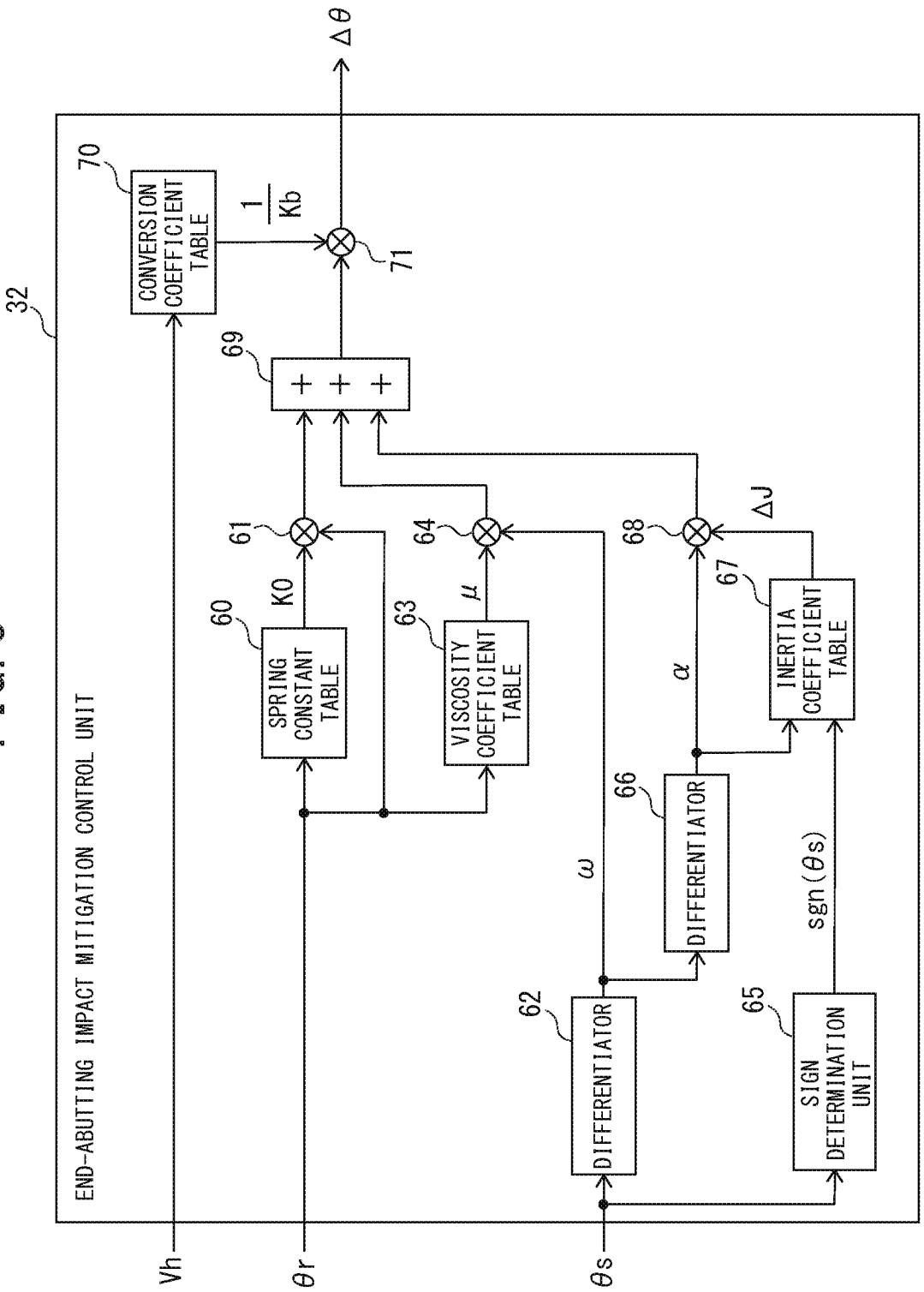

TURNING CONTROL DEVICE

CROSS REFERENCE TO RELATED APPLICATIONS

This application is a National Stage of International Application No. PCT/JP2020/039577 filed Oct. 21, 2020, claiming priority based on Japanese Patent Application No. 2019-213626 filed Nov. 26, 2019.

TECHNICAL FIELD

The present invention relates to a turning control device.

BACKGROUND ART

In a turning mechanism of a vehicle, when a turning angle increases and reaches a mechanical maximum turning angle, the rack shaft of the turning mechanism reaches a stroke end and it becomes impossible to increase the turning angle any further. The rack shaft being brought to a state of having reached a stroke end as described above is referred to as "end-abutting". When end-abutting occurs at high turning velocity, there is a possibility that large impact and hit sound (abnormal noise) are generated and the driver feels uncomfortable.

In PTL 1, a technology for suppressing increase in the turning angle around the maximum turning angle in a system (such as a steer by wire system) controlling the turning angle of a turning mechanism, based on a target turning angle is described.

The technology described in PTL 1 rapidly generates steering reaction force that returns the steering wheel to the neutral point side near the upper limit and the lower limit of a turning range of the turning mechanism. When such steering reaction force is applied, the driver is urged not to steer the steering wheel in a direction in which the turning angle changes toward a maximum turning angle, as a result of which occurrence of end-abutting is suppressed.

CITATION LIST

Patent Literature

PTL 1: JP 2004-130971 A

SUMMARY OF INVENTION

Technical Problem

However, even if such a steering reaction force is provided, if the driver steers against the steering reaction force, the end-abutting may occur, and the impact and hit sound (abnormal noise) at the time of collision may not be effectively suppressed.

In addition, when the increase in the turning angle is suppressed excessively for suppressing impact and hit sound (abnormal noise) due to end-abutting, the turning angle becomes less likely to increase to a maximum turning angle, thereby a minimum turning radius of the vehicle may become larger and handling of the vehicle may be deteriorated.

The present invention has been made focusing on the above problem, and it is an object of the present invention to suppress impact and hit sound (abnormal noise) due to end-abutting without deteriorating the minimum turning radius, in a system controlling a turning angle of a turning mechanism based on a target turning angle.

Solution to Problem

In order to achieve the above-described object, a turning control device according to one aspect of the present invention includes a first steering angle detection unit configured to detect a first steering angle of a turning mechanism, a first actuator configured to drive the turning mechanism, a second steering angle detection unit configured to detect a second steering angle of a steering mechanism, a target steering angle calculation unit configured to calculate a target steering angle of the turning mechanism, based on at least the second steering angle, a steering angular displacement calculation unit configured to, when a third steering angle, the third steering angle being either the first steering angle or the second steering angle, is in an angular range from a maximum steering angle that the third steering angle can take to a first threshold steering angle, calculate a steering angular displacement of the third steering angle with the first threshold steering angle used as a reference, a steering angle correction value calculation unit configured to calculate a steering angle correction value according to at least the steering angular displacement, a steering angle correction value limiting unit configured to determine whether a steering state is a state of a driver further turning a steering wheel or a state of the driver returning the steering wheel and limit the steering angle correction value according to at least the steering state, angular velocity of the third steering angle, and the third steering angle, a corrected target steering angle calculation unit configured to, by correcting the target steering angle with the steering angle correction value limited by the steering angle correction value limiting unit, calculate a corrected target steering angle, and a steering angle control unit configured to control the first actuator in such a way that the first steering angle coincides with the corrected target steering angle.

Advantageous Effects of Invention

According to the present invention, it is possible to suppress impact and hit sound (abnormal noise) due to end-abutting without deteriorating the minimum turning radius, in a system controlling a turning angle of a turning mechanism based on a target turning angle.

BRIEF DESCRIPTION OF DRAWINGS

FIG. 5 is a block diagram illustrative of an example of a functional configuration of an end-abutting impact mitigation control unit of the first embodiment;

DESCRIPTION OF EMBODIMENTS

Embodiments of the present invention will be described in detail with reference to the drawings.

Note that the embodiments of the present invention to be described below indicate devices and methods to embody the technical idea of the present invention by way of example, and the technical idea of the present invention does not limit the constitution, arrangements, and the like of the constituent components to those described below. The technical idea of the present invention can be subjected to a variety of alterations within the technical scope prescribed by the claims described in CLAIMS.

First Embodiment (Configuration)

Figure 1:
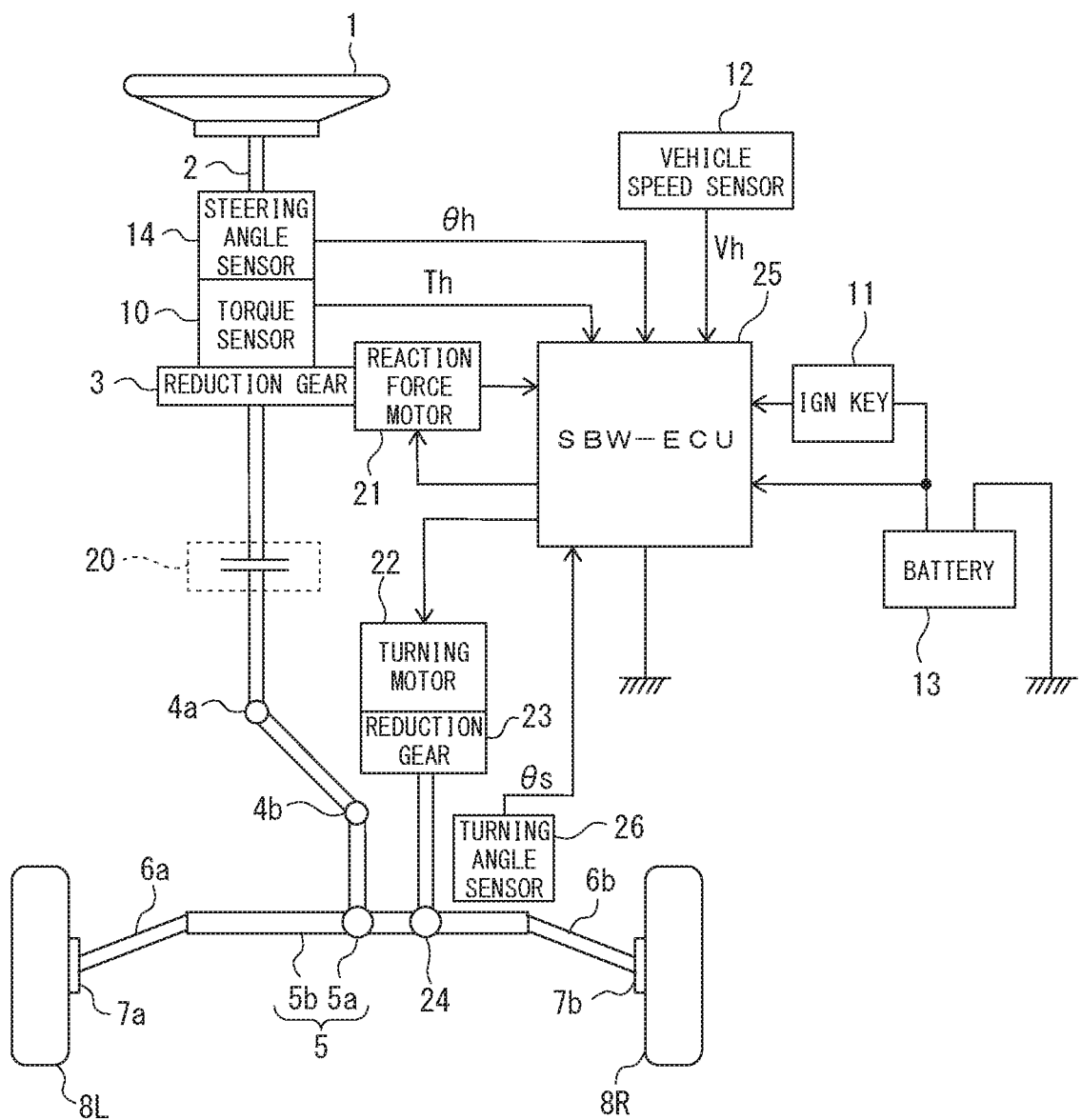
FIG. 1 is a configuration diagram illustrative of an outline of an example of a turning device of embodiments.

The present invention is applied to a turning device that controls a turning angle of a turning mechanism (that is, a turning angle of turning wheels), based on a target turning angle. FIG. 1 illustrates, as an example of such a turning device, a turning device that includes a steer by wire (SBW) mechanism in which a steering mechanism and a turning mechanism are mechanically separated from each other. However, the present invention is not limited to a turning device including a steer by wire mechanism, and the present invention is widely applicable to a variety of turning devices as long as the turning device is a turning device that controls a turning angle of a turning mechanism, based on a target turning angle.

A steering shaft (steering wheel shaft) 2 of a steering wheel 1 is connected to steered wheels 8L and 8R by way of a reduction gear (worm gear) 3 that constitutes a speed reduction mechanism, a backup clutch 20, universal joints 4a and 4b, a pinion rack mechanism 5, and tie rods 6a and 6b and further via hub units 7a and 7b.

The pinion rack mechanism 5 includes a pinion 5a that is coupled to a pinion shaft to which steering force is transmitted from the universal joint 4b and a rack 5b that meshes with the pinion 5a, and converts rotational motion transmitted to the pinion 5a to linear motion in the vehicle width direction by means of the rack 5b. To the rack 5b, a turning angle sensor 26 that detects a movement amount of the rack 5b and thereby detects a turning angle θs of the steered wheels 8L and 8R is disposed.

To the steering shaft 2, a torque sensor 10 that detects reaction torque Th is disposed. To the steering shaft 2, a steering angle sensor 14 that detects a steering angle θh of the steering wheel 1 or the steering shaft 2 is also disposed.

A reaction force motor 21 that applies reaction torque Th to the steering wheel 1 is connected to the steering shaft 2 via the reduction gear 3.

Note that the steering angle sensor 14 and the turning angle sensor 26 are not essential components and the steering angle θh and the turning angle θs may be acquired based on a motor rotation angle detected by a rotation angle sensor, such as a resolver, connected to the reaction force motor 21 or the turning motor 22.

The turning motor 22, which turns the steered wheels 8L and 8R, is connected to a pinion 24 via a reduction gear 23, and the pinion 24 meshes with the rack 5b. This configuration causes rotational motion of the turning motor 22 to be converted to linear motion in the vehicle width direction of the rack 5b.

Note that a means for applying the reaction torque Th to the steering wheel 1 and a means for turning the steered wheels 8L and 8R are not limited to an electric motor and a variety of types of actuators can be used.

The backup clutch 20 mechanically separates the steering wheel 1 and the steered wheels 8L and 8R from each other when brought to a released state and mechanically connects the steering wheel 1 and the steered wheels 8L and 8R to each other when brought to an engaged state. In other words, the backup clutch 20 mechanically separates the steering mechanism and the turning mechanism from each other when brought to the released state and mechanically connects the steering mechanism and the turning mechanism to each other when brought to the engaged state.

In the following description, the turning angle θs of the turning mechanism (that is, the turning angle θs of the steered wheels 8L and 8R) and the steering angle θh of the steering mechanism (that is, the steering angle θh of the steering wheel 1 or the steering shaft 2) are sometimes referred to as a first steering angle θs and a second steering angle θh, respectively.

To a steer by wire-electronic control unit (SBW-ECU) 25 configured to control a steer by wire mechanism, power is supplied from a battery 13 and, in conjunction therewith, an ignition key signal is input via an ignition (IGN) key 11.

The SBW-ECU 25 performs calculation of a current command value of a turning control command, based on vehicle speed Vh detected by a vehicle speed sensor 12, the second steering angle $\theta h$ detected by the steering angle sensor 14, and the first steering angle $\theta s$ detected by the turning angle sensor 26 and controls current supplied to the turning motor 22, based on a voltage control command value obtained by applying compensation and the like to the current command value.

The SBW-ECU 25 also calculates a target reaction torque Thr, based on the vehicle speed Vh detected by the vehicle speed sensor 12 and the second steering angle $\theta h$ detected by the steering angle sensor 14 and performs feedback control to bring the reaction torque Th detected by the torque sensor 10 close to the target reaction torque Thr.

The SBW-ECU 25 may include, for example, a computer including at least one processor and peripheral components, such as a storage device. The processor may be, for example, a CPU or an MPU.

The storage device may include any of a semiconductor storage device, a magnetic storage device, and an optical storage device. The storage device may include registers, a cache memory, or a memory, such as a ROM and a RAM that are used as a main storage device.

Functions of the SBW-ECU 25 that will be described below are achieved by, for example, the processor of the SBW-ECU 25 executing computer programs stored in the storage device.

Note that the SBW-ECU 25 may be formed using dedicated hardware for performing respective parts of information processing, which will be described below.

For example, the SBW-ECU 25 may include functional logic circuits that are set in a general-purpose semiconductor integrated circuit. For example, the SBW-ECU 25 may have a programmable logic device, such as a field programmable gate array.

Figure 2:
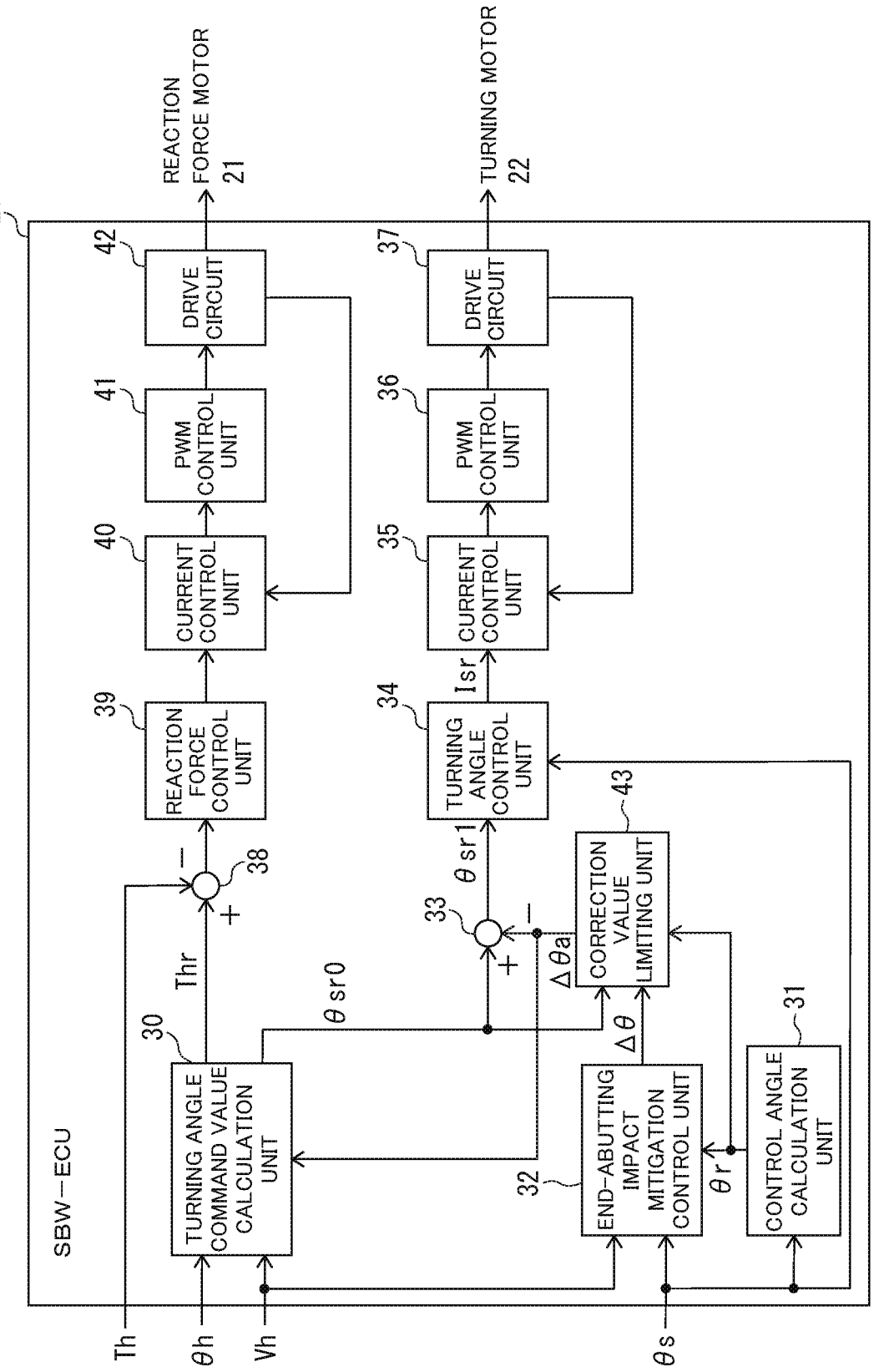
FIG. 2 is a block diagram illustrative of an example of a functional configuration of a steer by wire-electronic control unit (SBW-ECU) of a first embodiment.

With reference to FIG. 2, an example of a functional configuration of the SBW-ECU 25 of the first embodiment will be described. The SBW-ECU 25 includes a turning angle command value calculation unit 30, a control angle calculation unit 31, an end-abutting impact mitigation control unit 32, subtracters 33 and 38, a turning angle control unit 34, current control units 35 and 40, pulse width modulation (PWM) control units 36 and 41, drive circuits 37 and 42 that are inverters or the like, a reaction force control unit 39, and a correction value limiting unit 43.

The turning angle command value calculation unit 30 calculates a target steering angle $\theta sr0$ of the first steering angle $\theta s$ of the turning mechanism, based on at least the second steering angle $\theta h$. In the present example, the turning angle command value calculation unit 30 calculates the target steering angle $\theta sr0$, based on the second steering angle $\theta h$ and the vehicle speed Vh. The turning angle command value calculation unit 30 also calculates a target reaction torque Thr that is applied to the steering mechanism, based on at least the second steering angle $\theta h$. Details of the turning angle command value calculation unit 30 will be described later.

The control angle calculation unit 31 and the end-abutting impact mitigation control unit 32 perform end-abutting impact mitigation control for mitigating impact at the time of end-abutting.

In the end-abutting impact mitigation control, when the first steering angle $\theta s$ is within an angular range from a predetermined first threshold steering angle to a maximum steering angle, the target steering angle $\theta sr0$ is corrected to decrease and impact at the time of end-abutting is thereby mitigated.

The control angle calculation unit 31 calculates a control angle $\theta r$ that is used for the end-abutting impact mitigation control.

Figure 3:
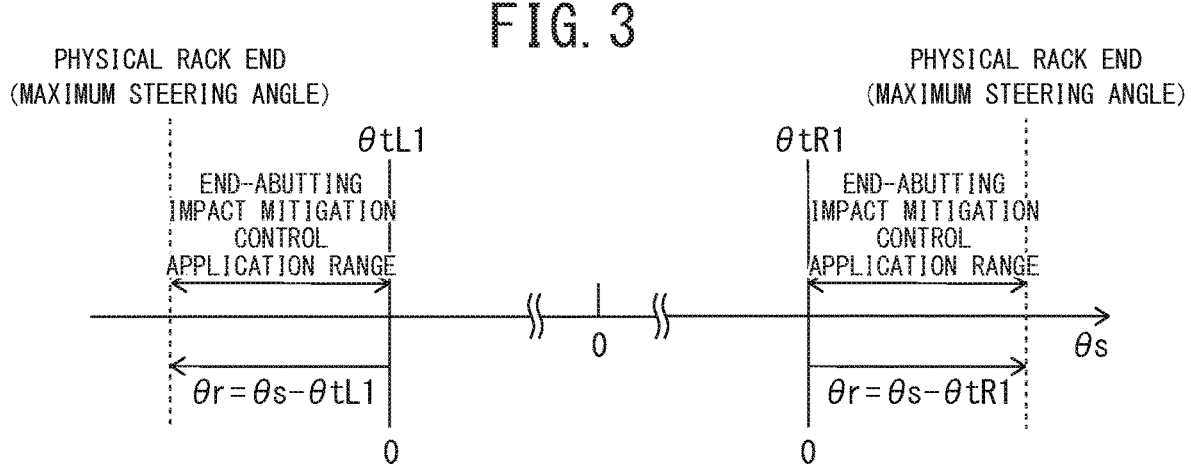
FIG. 3 is an explanatory diagram of an operation example of a control angle calculation unit.

FIG. 3 is now referred to. The sign is defined in such a way that the first steering angle $\theta s$ has a positive value when the steered wheels 8L and 8R are turned to the right and the first steering angle $\theta s$ has a negative value when the steered wheels 8L and 8R are turned to the left.

The end-abutting impact mitigation control is performed when the first steering angle $\theta s$ is in a range from a positive first threshold steering angle $\theta tR1$ to a positive maximum steering angle and when the first steering angle $\theta s$ is in a range from a negative first threshold steering angle $\theta tL1$ to a negative maximum steering angle.

The control angle calculation unit 31 calculates a steering angular displacement of the first steering angle $\theta s$ with the first threshold steering angle $\theta tR1$ used as a reference as a control angle $\theta r$ when the first steering angle $\theta s$ is in the range from the first threshold steering angle $\theta tR1$ to the positive maximum steering angle. For example, the control angle calculation unit 31 calculates a difference $(\theta s - \theta tR1)$ between the first steering angle $\theta s$ and the first threshold steering angle $\theta tR1$ as a control angle $\theta r$.

The control angle calculation unit 31 calculates a steering angular displacement of the first steering angle $\theta s$ with the first threshold steering angle $\theta tL1$ used as a reference as a control angle $\theta r$ when the first steering angle $\theta s$ is in the range from the first threshold steering angle $\theta tL1$ to the negative maximum steering angle. For example, the control angle calculation unit 31 calculates a difference $(\theta s - \theta tL1)$ between the first steering angle $\theta s$ and the first threshold steering angle $\theta tL1$ as a control angle $\theta r$.

The control angle calculation unit 31 sets the control angle $\theta r$ at 0 when the first steering angle $\theta s$ is in a range of the negative first threshold steering angle $\theta tL1$ or more and the positive first threshold steering angle $\theta tR1$ or less.

FIG. 2 is now referred to. The end-abutting impact mitigation control unit 32 calculates a steering angle correction value $\Delta\theta$ for correcting the target steering angle $\theta sr0$ in such a way as to reduce the target steering angle $\theta sr0$ in the end-abutting impact mitigation, based on the control angle $\theta r$ and angular velocity $\omega$ of the first steering angle $\theta s$. Details of the end-abutting impact mitigation control unit 32 will be described later.

The correction value limiting unit 43 limits the steering angle correction value $\Delta\theta$. When the end-abutting impact mitigation control unit 32 outputs a large steering angle correction value $\Delta\theta$, the target steering angle $\theta sr0$, which is reduced according to the steering angle correction value $\Delta\theta$, becomes small and the first steering angle $\theta s$ becomes less likely to increase to a maximum steering angle. There is a possibility that this phenomenon causes the minimum turning radius of the vehicle to become larger and handling of the vehicle to deteriorate.

On the other hand, it can be conjectured that, when the driver continues further turning the steering wheel even when the rack 5b has come close to a stroke end, the driver attempts to turn the vehicle with the minimum turning radius.

When the turning velocity of the turning mechanism (that is, the angular velocity $\omega$ of the first steering angle $\theta s$) is sufficiently low, it is possible to reduce or avoid discomfort that the driver feels due to impact and hit sound (abnormal noise) caused by end-abutting.

Thus, the correction value limiting unit 43 determines whether the steering state is a state of the driver further turning the steering wheel or a state of the driver returning the steering wheel and limits the steering angle correction value Δθ according to at least the steering state, the first steering angle θs, and the angular velocity ωo. The correction value limiting unit 43 outputs a steering angle correction value Δθ that is limited as a limited steering angle correction value Δθa. Details of the correction value limiting unit 43 will be described later.

The subtracter 33 corrects the target steering angle θsr0 by subtracting the limited steering angle correction value Δθa, which the correction value limiting unit 43 output, from the target steering angle θsr0, which the turning angle command value calculation unit 30 calculated, and thereby obtains a corrected target steering angle θsr1.

On the other hand, the turning angle command value calculation unit 30 corrects the target reaction torque Thr according to the limited steering angle correction value Δθa.

The turning angle control unit 34 generates a current command value Isr, based on deviation between the corrected target steering angle θsr1 and an actual first steering angle θs.

The current control unit 35 generates a voltage control command value, based on deviation between the current command value Isr and a fed-back motor current value of the turning motor 22. The PWM control unit 36 controls the drive circuit 37, based on the voltage control command value generated by the current control unit 35 and thereby PWM-drives the turning motor 22.

On the other hand, the target reaction torque Thr calculated by the turning angle command value calculation unit 30 is input to the subtracter 38, and the subtracter 38 calculates a torque deviation that is obtained by subtracting the reaction torque Th, which is detected by the torque sensor 10, from the target reaction torque Thr. The reaction force control unit 39 generates a current command value, based on the torque deviation calculated by the subtracter 38.

The current control unit 40 generates a voltage control command value, based on deviation between the current command value calculated by the reaction force control unit 39 and a fed-back motor current value of the reaction force motor 21. The PWM control unit 41 controls the drive circuit 42, based on the voltage control command value generated by the current control unit 40 and thereby PWM-drives the reaction force motor 21.

Next, the turning angle command value calculation unit 30 will be described.

Figure 4:
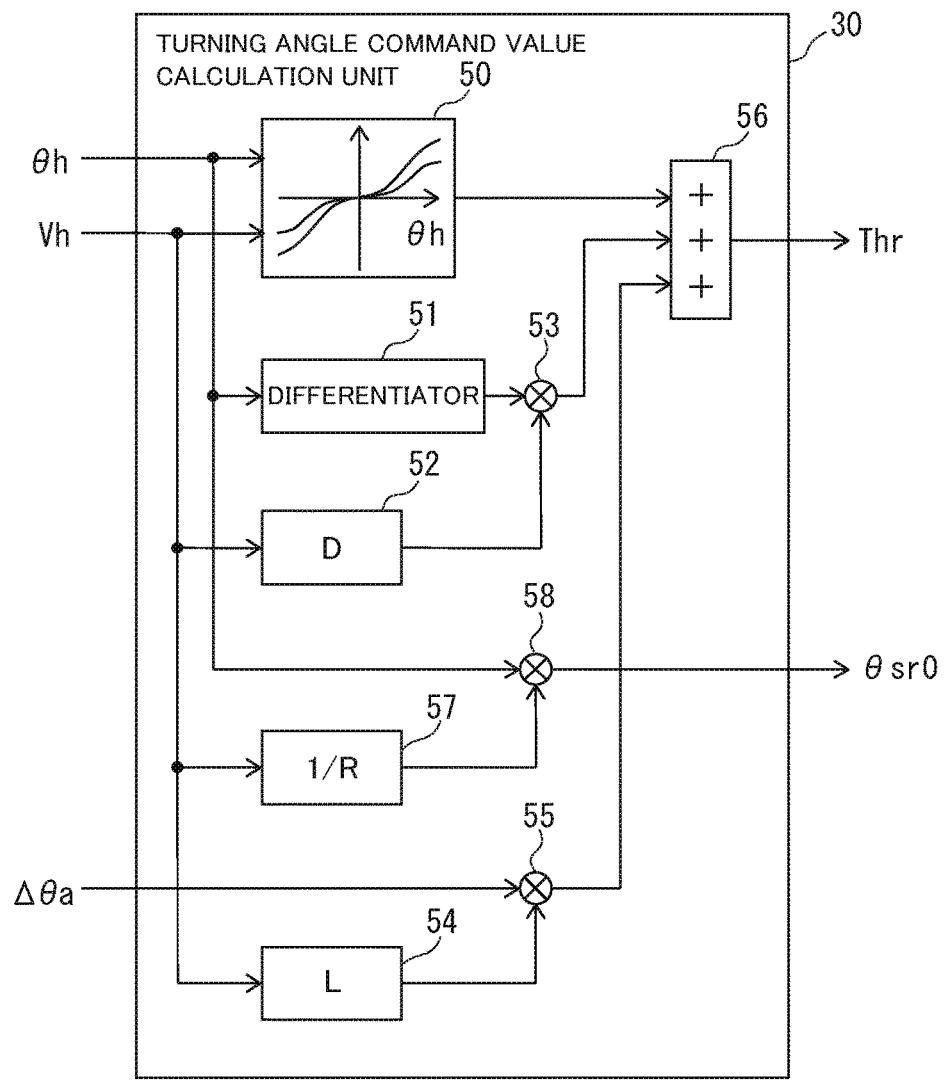
FIG. 4 is a block diagram illustrative of an example of a functional configuration of a turning angle command value calculation unit.

FIG. 4 is now referred to. The turning angle command value calculation unit 30 includes a base reaction torque calculation unit 50, a differentiator 51, a damping coefficient table 52, multipliers 53, 55, and 58, a reaction force correction coefficient table 54, an adder 56, and a turning ratio table 57.

The base reaction force torque calculation unit 50 calculates a base reaction torque, based on the second steering angle θh and the vehicle speed Vh. The base reaction torque is input to the adder 56.

The differentiator 51 differentiates the second steering angle θh and thereby calculates a steering velocity dθh/dt. The damping coefficient table 52 outputs a damping coefficient (viscosity coefficient) D depending on the vehicle speed Vh to the multiplier 53. The multiplier 53 multiplies the steering velocity dθh/dt by the damping coefficient D and thereby calculates a viscous torque component.

The turning ratio table 57 outputs a turning ratio 1/R depending on the vehicle speed Vh to the multiplier 58. The multiplier 58 multiplies the second steering angle θh by the turning ratio 1/R and thereby calculates the target steering angle θsr0. Therefore, the target steering angle θsr0 increases according to increase in the second steering angle θh.

The reaction force correction coefficient table 54 outputs a reaction force correction coefficient L depending on the vehicle speed Vh to the multiplier 55.

The multiplier 55 multiplies the limited steering angle correction value Δθa by the reaction force correction coefficient L and thereby calculates a correction torque component. The adder 56 adds the viscous torque component and the correction torque component to the base reaction torque and thereby calculates a target reaction torque Thr. This calculation causes the target reaction torque Thr to be corrected according to the limited steering angle correction value Δθa.

Thus, output of the limited steering angle correction value Δθa in the end-abutting impact mitigation control causes the reaction torque to increase. The increase in the reaction torque enables the second steering angle θh to be suppressed from increasing. In addition, notifying the driver of the rack 5b coming close to a stroke end enables the second steering angle θh to be suppressed from increasing.

As a result, it is possible to suppress the target steering angle θsr0 from increasing in directions toward the maximum steering angles and effectively generate virtual stroke ends of the rack 5b.

Because of this configuration, setting the reaction force correction coefficient L appropriately enables the virtual stroke ends to be generated and, at the same time, excessive steering reaction force to be prevented from being provided to the driver.

Note that the correction torque component may be calculated by multiplying, in place of the limited steering angle correction value Δθa, a difference (θsr0−θs) between the target steering angle θsr0 and the first steering angle θs by the reaction force correction coefficient L.

Next, the end-abutting impact mitigation control unit 32 will be described. The end-abutting impact mitigation control unit 32 calculates a turning torque Tm that is exerted in a direction in which the turning mechanism is returned to a neutral position and calculates a change amount Δθ of the first steering angle θs when the turning torque Tm acts on the turning mechanism as a steering angle correction value Δθ for correcting the target steering angle θsr0, when the end-abutting impact mitigation control is performed.

A conversion processing from the turning torque Tm to the steering angle correction value Δθ, which is performed by the end-abutting impact mitigation control unit 32, will be described below.

The steering angle correction value Δθ, which is an output from the end-abutting impact mitigation control unit 32, by correcting the target steering angle θsr0, acts on the turning mechanism as the turning torque Tm. When it is now assumed that characteristics of the turning mechanism, tires, and road surface reaction force are expressed by $1/(Js^2+Dms+Kb)$, the first steering angle θs of the turning mechanism is expressed by the formula (1) below.

[Math 1]

$$\theta s = \frac{Tm}{J \cdot s^2 + Dm \cdot s + Kb} \quad (1)$$

In the formula (1), J is column shaft inertia that is obtained by converting inertia of the turning motor 22, the turning mechanism, and the tires to inertia acting on the steering shaft 2, Dm is a converted value of viscosity coefficients of the turning motor 22, the turning mechanism, and the tires that is obtained by converting the viscosity coefficients to a viscosity coefficient of viscous resistance acting on the steering shaft 2, Kb is a spring constant of the sum of reaction force from the road surface and lifting torque, and s is a Laplace operator.

Change $\Delta\theta$ in the first steering angle $\theta s$ when the turning torque Tm acts on the turning mechanism is expressed by the formula (2) below, using the final value theorem of the Laplace transform (steady-state value).

[Math 2]

$$\Delta\theta = \lim_{s \to 0} s \frac{Tm}{J \cdot s^2 + Dm \cdot s + Kb} \frac{1}{s} = \frac{Tm}{Kb} \quad (2)$$

Correcting the target steering angle $\theta sr0$ with this $\Delta\theta$ (that is, subtracting $\Delta\theta$ from the target steering angle $\theta sr0$) enables the target steering angle $\theta sr0$ to be corrected in such a way that the turning torque Tm acts on the turning mechanism in a direction in which the turning mechanism is returned to the neutral position.

When the turning torque Tm expressed by the formula (3) below is exerted on the turning mechanism, the steering angle correction value $\Delta\theta$ can be calculated by the formula (4) below. The end-abutting impact mitigation control unit 32 calculates the steering angle correction value $\Delta\theta$ in accordance with the formula (4) below.

[Math 3]

$$Tm = K0 \cdot \theta r + \mu \cdot \omega + \Delta J \cdot \alpha \quad (3)$$

$$\Delta\theta = \frac{K0 \cdot \theta r + \mu \cdot \omega + \Delta J \cdot \alpha}{Kb} \quad (4)$$

In the formula (4), K0 is a spring constant of an elastic torque component, $\mu$ is a viscosity coefficient of a viscous torque component, $\omega$ is angular velocity of the first steering angle $\theta s$, $\Delta J$ is an inertia coefficient of an inertia torque component, and $\alpha$ is angular acceleration of the first steering angle $\theta s$.

With reference to FIG. 5, a configuration of the end-abutting impact mitigation control unit 32 will be described below. The end-abutting impact mitigation control unit 32 includes a spring constant table 60, multipliers 61, 64, 68, and 71, differentiators 62 and 66, a viscosity coefficient table 63, a sign determination unit 65, an inertia coefficient table 67, an adder 69, and a conversion coefficient table 70.

The spring constant table 60 outputs a spring constant K0 depending on the control angle $\theta r$ to the multiplier 61 as a spring constant of an elastic torque component of the turning torque Tm. The multiplier 61 multiplies the control angle $\theta r$ by the spring constant K0 and thereby calculates an elastic torque component (K0·$\theta r$) of the turning torque Tm. and outputs the calculated elastic torque component (K0·$\theta r$) to the adder 69.

Figure 6A:
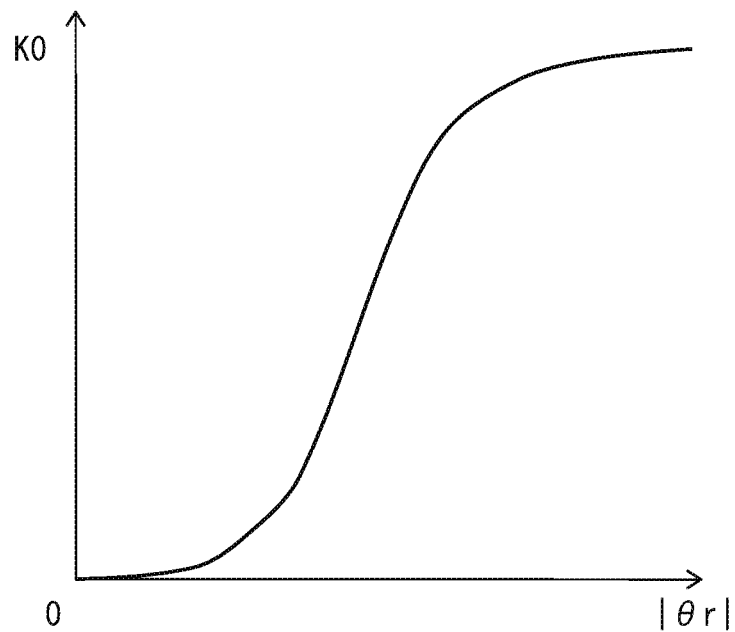
FIGS. 6A and 6B are a characteristic diagram of an example of a spring constant and a characteristic diagram of an example of a viscosity coefficient, respectively.
Figure 6B:
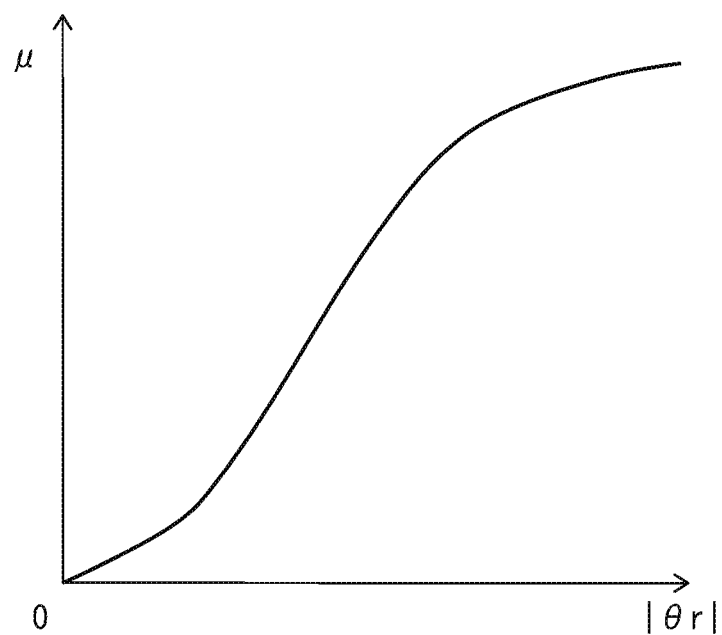

The differentiator 62 differentiates the first steering angle $\theta s$ and thereby calculates an angular velocity $\omega$ of the first steering angle $\theta s$. The viscosity coefficient table 63 outputs a viscosity coefficient $\mu$ depending on the control angle $\theta r$ to the multiplier 64 as a viscosity coefficient of a viscous torque component of the turning torque Tm. The multiplier 64 multiplies the angular velocity $\omega$ by the viscosity coefficient $\mu$ and thereby calculates a viscous torque component ($\mu \cdot \omega$) of the turning torque Tm and outputs the calculated viscous torque component ($\mu \cdot \omega$) to the adder 69. FIGS. 6A and 6B are characteristic diagrams of examples of characteristics of the spring constant K0 and the viscosity coefficient $\mu$, respectively.

The sign determination unit 65 determines a positive/negative sign of the first steering angle $\theta s$ and outputs a sign sgn($\theta s$) of the first steering angle $\theta s$. The differentiator 66 differentiates the angular velocity $\omega$ and thereby calculates an angular acceleration $\alpha$ of the first steering angle $\theta s$. The inertia coefficient table 67 outputs an inertia coefficient $\Delta J$ depending on the angular acceleration $\alpha$ and the sign sgn($\theta s$) to the multiplier 68 as an inertia coefficient of an inertia torque component of the turning torque Tm. The multiplier 68 multiplies the angular acceleration $\alpha$ by the inertia coefficient $\Delta J$ and thereby calculates an inertia torque component ($\Delta J \cdot \alpha$) of the turning torque Tm and outputs the calculated inertia torque component ($\Delta J \cdot \alpha$) to the adder 69.

Performing correction based on the inertia of the turning mechanism, using the inertia torque component ($\Delta J \cdot \alpha$) enables inertia torque in acceleration and deceleration of the first steering angle $\theta s$ to be adjusted.

Figure 7A:
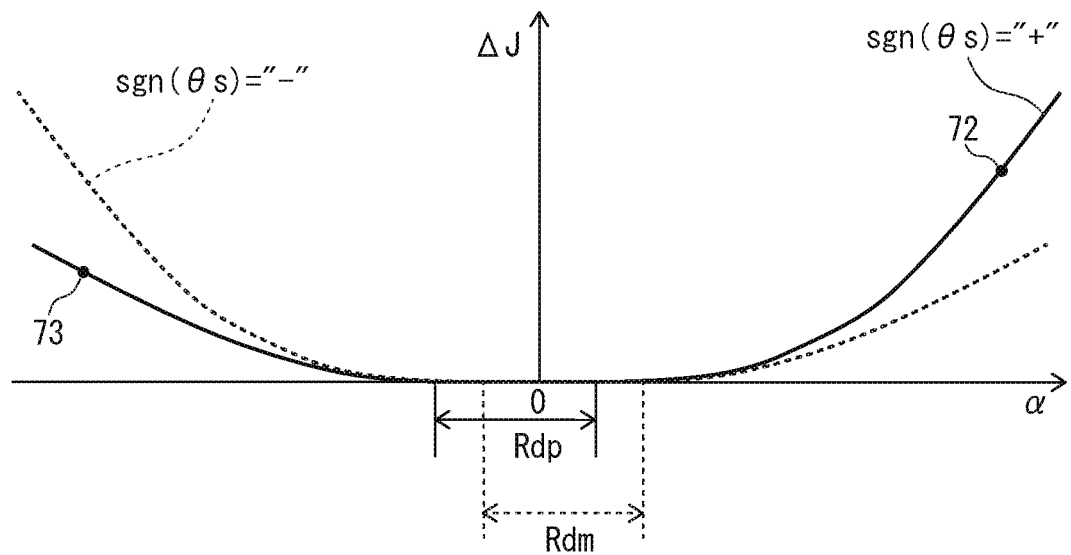
FIGS. 7A, 7B, and 7C are a characteristic diagram of an example of an inertia coefficient, a diagram illustrative of a setting example of an inertia coefficient in a low inertia system, and a diagram illustrative of a setting example of an inertia coefficient in a high inertia system, respectively.

FIG. 7A illustrates an example of characteristics of the inertia coefficient $\Delta J$. In FIG. 7A, a solid line illustrates the characteristics in the case where the sign sgn($\theta s$) of the first steering angle $\theta s$ is positive (+), and a dashed line illustrates the characteristics in the case where the sign sgn($\theta s$) is negative (−). The same applies to FIGS. 7B and 7C.

When, as illustrated by, for example, a reference sign 72, the sign sgn($\theta s$) is positive and the angular acceleration $\alpha$ is positive, the characteristics of the inertia coefficient $\Delta J$ are set in such a way that the inertia coefficient $\Delta J$ has a comparatively large value in order to generate a reaction force causing the first steering angle $\theta s$ to decelerate when the driver further turns the steering wheel (when the first steering angle $\theta s$ and the angular velocity $\omega$ have the same sign).

When, as illustrated by, for example, a reference sign 73, the sign sgn($\theta s$) is positive and the angular acceleration $\alpha$ is negative, the characteristics of the inertia coefficient $\Delta J$ are set in such a way that the inertia coefficient $\Delta J$ has a comparatively small value in order to reduce reaction force because the deceleration of the first steering angle $\theta s$ is an adequate deceleration in the case of the driver further turning the steering wheel.

In the case of the driver returning the steering wheel (when the first steering angle $\theta s$ and the angular velocity $\omega$ have different signs), the characteristics of the inertia coefficient $\Delta J$ are set in such a way that the inertia coefficient $\Delta J$ has a comparatively small value in order to reduce reaction force because acceleration of the first steering angle $\theta s$ is an excessive acceleration. Note that the characteristics of the inertia coefficient $\Delta J$ may be differentiated between when the driver further turns the steering wheel and when the driver returns the steering wheel.

The inertia coefficient $\Delta J$ in the case where the sign $\mathrm{sgn}(\theta s)$ is negative (the dashed line) has characteristics that is line-symmetric to the characteristics of the inertia coefficient $\Delta J$ in the case where the sign $\mathrm{sgn}(\theta s)$ is positive (the solid line) with the axis on which the angular acceleration $\alpha=0$ holds as the symmetry axis.

The inertia coefficient $\Delta J$ may have dead zones Rdp and Rdm with respect to the angular acceleration $\alpha$. The width of a positive range and the width of a negative range within each of the dead zones Rdp and Rdm may be different from each other.

Figure 7B:
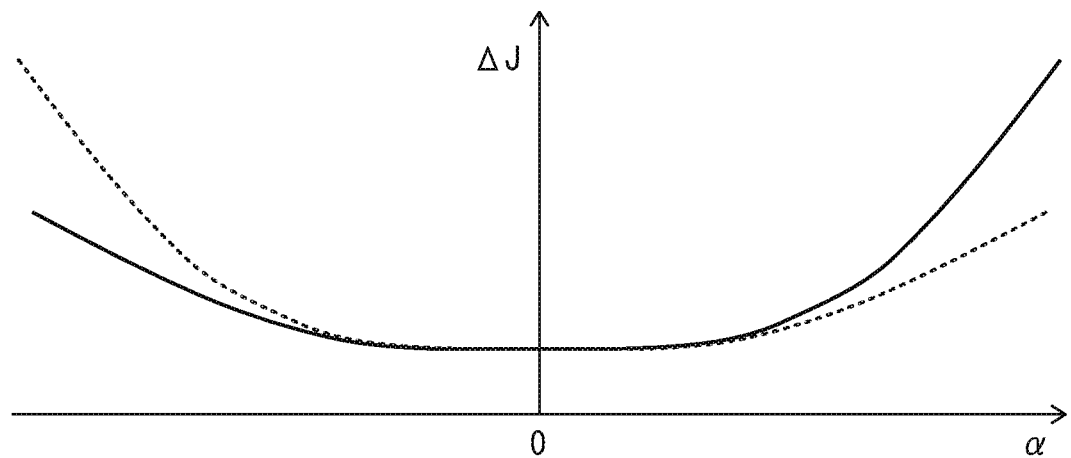
Figure 7C:
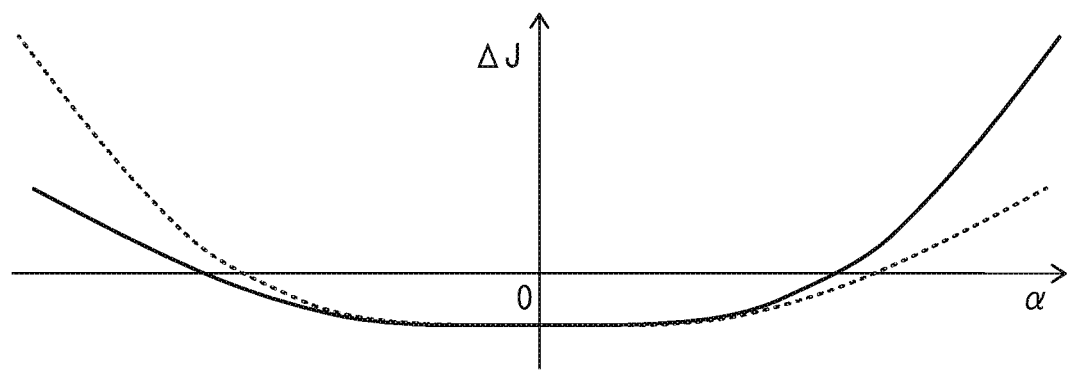

As illustrated in FIGS. 7B and 7C, the characteristics of the inertia coefficient $\Delta J$ may be offset in such a way that the inertia coefficient $\Delta J$ has a positive or negative value, which is not 0, at the point at which the angular acceleration $\alpha=0$ holds.

In a low inertia system such as a small-size vehicle, increasing the inertia coefficient $\Delta J$ as illustrated in FIG. 7B enables stability to be increased. On the other hand, in a high inertia system such as a large-size vehicle, decreasing the inertia coefficient $\Delta J$ as illustrated in FIG. 7C enables responsiveness to be increased.

FIG. 5 is now referred to. The adder 69 adds the elastic torque component ($K0 \cdot \theta r$), the viscous torque component ($\mu \cdot \omega$), and the inertia torque component ($\Delta J \cdot \alpha$) and thereby calculates the turning torque Tm of the formula (3) above.

The conversion coefficient table 70 outputs a conversion coefficient (1/Kb) for converting the turning torque Tm to the steering angle correction value $\Delta \theta$. The constant Kb is the sum of reaction force from the road surface and the lifting torque. Since the reaction force from the road surface changes according to the vehicle speed Vh, the conversion coefficient table 70 may output different conversion coefficients 1/Kb depending on the vehicle speed Vh.

The multiplier 71 multiplies the turning torque Tm by the conversion coefficient (1/Kb) in accordance with the formula (4) above and thereby converts the turning torque Tm to the steering angle correction value $\Delta \theta$.

Note that the inertia torque component ($\Delta J \cdot \alpha$) is not necessarily essential and the sign determination unit 65, the differentiator 66, the inertia coefficient table 67, and the multiplier 68 may be omitted.

In addition, both the elastic torque component ($K0 \cdot \theta r$) and the viscous torque component ($\sim \cdot \omega$) do not have to be generated, and either thereof may be omitted. In this case, either a combination of the spring constant table 60 and the multiplier 61 or a combination of the differentiator 62, the viscosity coefficient table 63, and the multiplier 64 may be omitted.

Next, the correction value limiting unit 43 will be described. The correction value limiting unit 43 determines whether the steering state is a state of the driver further turning the steering wheel or a state of the driver returning the steering wheel and limits the steering angle correction value $\Delta \theta$ according to at least the steering state, the first steering angle $\theta s$, and the angular velocity co. The correction value limiting unit 43 outputs a steering angle correction value $\Delta \theta$ that is limited as a limited steering angle correction value $\Delta \theta a$.

Specifically, the correction value limiting unit 43 sets an upper limit of the steering angle correction value $\Delta \theta$ and, when the steering angle correction value $\Delta \theta$ is larger than the upper limit, outputs the upper limit as a limited steering angle correction value $\Delta \theta a$.

In addition, the correction value limiting unit 43 sets a lower limit of the steering angle correction value $\Delta \theta$ and, when the steering angle correction value $\Delta \theta$ is smaller than the lower limit, outputs the lower limit as a limited steering angle correction value $\Delta \theta a$.

When the steering angle correction value $\Delta \theta$ is the lower limit or more and the upper limit or less, the correction value limiting unit 43 directly outputs the steering angle correction value $\Delta \theta$ as a limited steering angle correction value $\Delta \theta a$.

The correction value limiting unit 43 sets an upper limit and a lower limit for each of a steering operation of turning the steering wheel 1 to the right and a steering operation of turning the steering wheel 1 to the left. Hereinafter, the steering operation of turning the steering wheel 1 to the right is referred to as "right steering", and the steering operation of turning the steering wheel 1 to the left is referred to as "left steering".

The correction value limiting unit 43 sets an upper limit $RU\theta$ of the steering angle correction value $\Delta \theta$ in the case of the right steering (hereinafter, referred to as "right upper limit $RU\theta$") and a lower limit $LL\theta$ of the steering angle correction value $\Delta \theta$ in the case of the left steering (hereinafter, referred to as "left lower limit $LL\theta$"), based on the steering state, the first steering angle $\theta s$, the angular velocity $\omega$, and the target steering angle $\theta sr0$.

When the correction value limiting unit 43 sets the right upper limit $RU\theta$ and the left lower limit $LL\theta$, the correction value limiting unit 43 sets an adjustment value Va, based on the steering state, the first steering angle $\theta s$, and the angular velocity $\omega$.

Figure 8A:
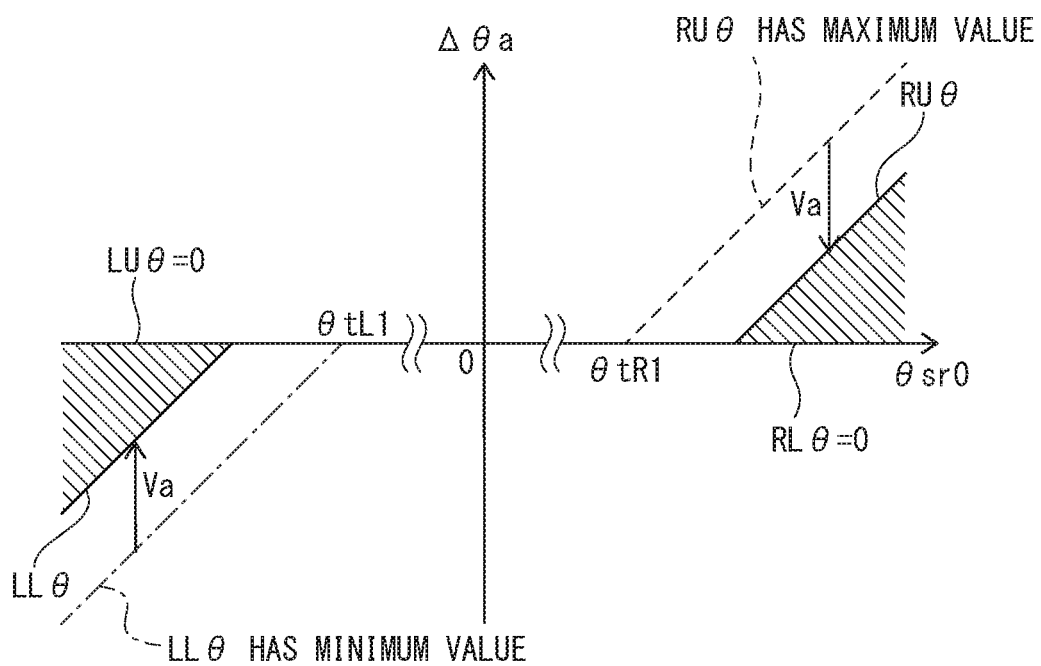
FIGS. 8A and 8B are explanatory diagrams of an upper limit and a lower limit of a steering angle correction value, respectively.

FIG. 8A is now referred to. The correction value limiting unit 43 subtracts the adjustment value Va from a difference ($\theta sr0 - \theta tR1$) that is obtained by subtracting the positive first threshold steering angle $\theta tR1$ from the target steering angle $\theta sr0$ and thereby calculates the right upper limit $RU\theta = (\theta sr0 - \theta tR1) - Va$. The right upper limit $RU\theta$ has a maximum value as illustrated by a dashed line when the adjustment value Va=0.

When a calculation result of the calculation formula $(\theta sr0 - \theta tR1) - Va$ of the right upper limit $RU\theta$ is less than 0, the correction value limiting unit 43 sets the right upper limit $RU\theta$ at 0.

A lower limit $RL\theta$ of the steering angle correction value $\Delta \theta$ in the case of the right steering (hereinafter, referred to as "right lower limit $RL\theta$") is set at 0.

In the case of the right steering, the correction value limiting unit 43 outputs a value obtained by limiting the steering angle correction value $\Delta \theta$ within a range bounded by the right lower limit $RL\theta$ and the right upper limit $RU\theta$ (a hatched range) as a limited steering angle correction value $\Delta \theta a$.

On the other hand, the correction value limiting unit 43 adds the adjustment value Va to a difference ($\theta sr0 - \theta tL1$) that is obtained by subtracting the negative first threshold steering angle $\theta tL1$ from the target steering angle $\theta sr0$ and thereby calculates the left lower limit $LL\theta = (\theta sr0 - \theta tL1) + Va$. The left lower limit $LL\theta$ has a minimum value (the absolute value thereof has a maximum value) as illustrated by an alternate long and short dash line when the adjustment value Va=0.

When a calculation result of the calculation formula $(\theta sr0 - \theta tL1) + Va$ of the left lower limit $LL\theta$ is greater than 0, the correction value limiting unit 43 sets the left lower limit $LL\theta$ at 0.

An upper limit $LU\theta$ of the steering angle correction value $\Delta \theta$ in the case of the left steering (hereinafter, referred to as "left upper limit $LU\theta$") is set at 0.

In the case of the left steering, the correction value limiting unit 43 outputs a value obtained by limiting the steering angle correction value Δθ within a range bounded by the left lower limit LLθ and the left upper limit LUθ (a hatched range) as a limited steering angle correction value Δθa.

Next, a setting method of the adjustment value Va will be described. The adjustment value Va is set based on the steering state, the first steering angle θs, and the angular velocity ω of the first steering angle θs.

Figure 9:
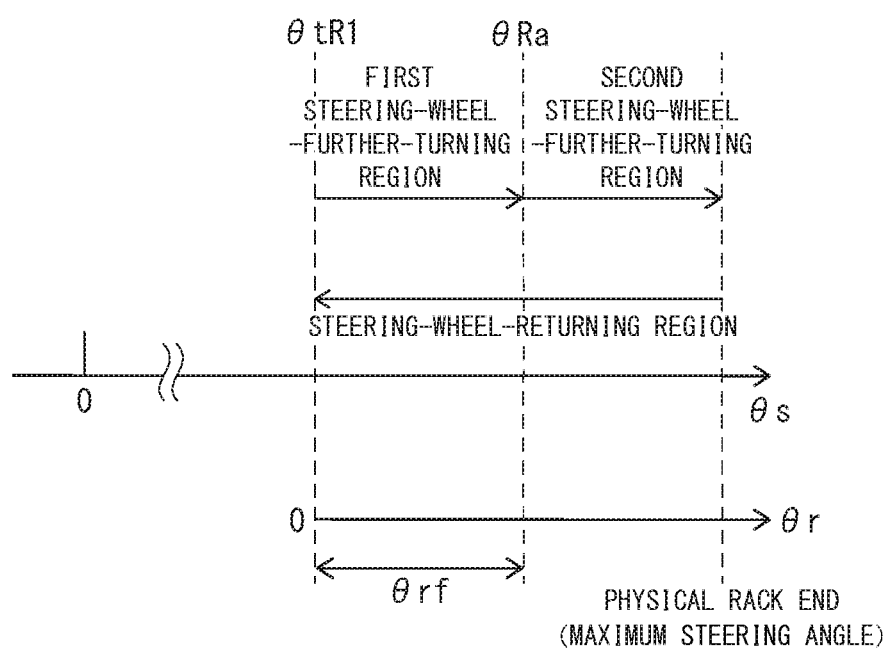
FIG. 9 is an explanatory diagram of a setting example of steering angle regions within an end-abutting mitigation control performance range.

FIG. 9 is now referred to. First, in a range in which the end-abutting impact mitigation control is performed at the time of the right steering (that is, a range of the first steering angle θs from the first threshold steering angle θtR1 to the maximum steering angle, and, hereinafter, sometimes referred to as "end-abutting impact mitigation control performance range"), a first steering-wheel-further-turning region, a second steering-wheel-further-turning region, and a steering-wheel-returning region are defined.

When the steering state is the state of the driver further turning the steering wheel, a region from the first threshold steering angle θtR1 (that is, the control angle θr=0) to a steering angle θRa (that is, the control angle θr=θrf) is defined as a "first steering-wheel-further-turning region".

When the steering state is the state of the driver further turning the steering wheel, a region from the steering angle θRa to the maximum steering angle is defined as a "second steering-wheel-further-turning region".

When the steering state is the state of the driver returning the steering wheel, the entire end-abutting impact mitigation control performance range is defined as a "steering-wheel-returning region". Note that, although, in FIG. 9, a setting example in the case of the right steering is illustrated, regions are similarly defined in the case of the left steering.

The adjustment value Va is set to be variable with respect to the magnitude (absolute value) |ω| of the angular velocity ω of the first steering angle θs. When the absolute value |ω| is small, the adjustment value Va is set to be large in such a way that severe limitation is applied to the end-abutting impact mitigation control by the correction value limiting unit 43, and, as the absolute value |ω| becomes larger, the adjustment value Va is set to be small in such a way that the limitation is reduced.

Figure 10A:
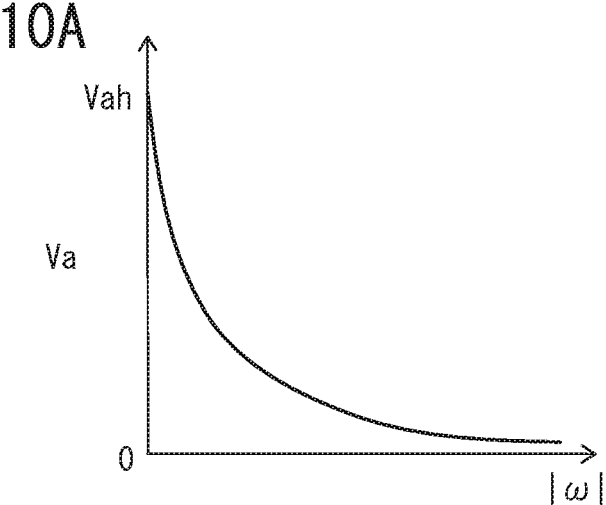
FIG. 10A is a characteristic diagram of an example of an adjustment value Va.

FIG. 10A is now referred to. The maximum value (hereinafter, referred to as "maximum adjustment value") and the minimum value (hereinafter, referred to as "minimum adjustment value") of the adjustment value Va are set at Vah and 0, respectively, and the adjustment value Va is set in such a way that, when the magnitude of the steering velocity ω is zero, the adjustment value Va coincides with the maximum adjustment value Vah and, as the magnitude of the steering velocity ω becomes larger, the adjustment value Va asymptotically approaches 0.

Further, the change rate of the adjustment value Va, which follows change in the angular velocity ω, is changed depending on in which one of the "first steering-wheel-further-turning region", the "second steering-wheel-further-turning region", and the "steering-wheel-returning region" described above the first steering angle θs or the control angle θr are included.

Figure 10B:
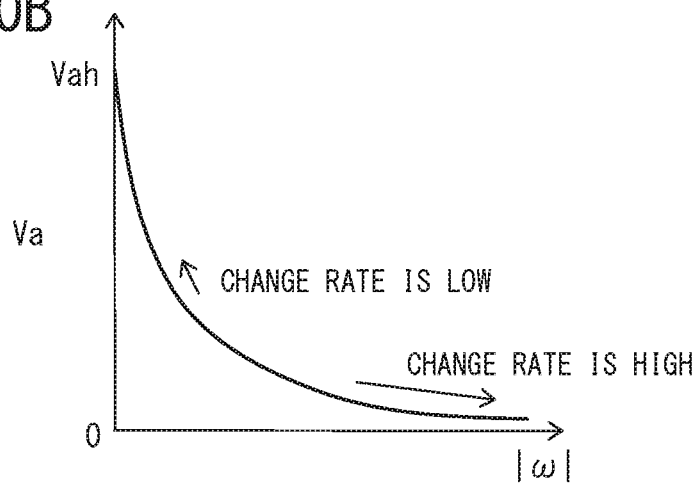
FIGS. 10B and 10C are explanatory diagrams of examples of rates of change in the adjustment value Va.

In other words, in the first steering-wheel-further-turning region, it is configured such that the adjustment value Va is strongly suppressed from changing in a direction toward the maximum adjustment value Vah even when the angular velocity ω becomes slow and, when the angular velocity ω is fast, the adjustment value Va is made to change in a direction toward the minimum adjustment value of 0 sufficiently rapidly, as illustrated in FIG. 10B.

In the steering-wheel-returning region, the adjustment value Va is made to change in a similar manner to the first steering-wheel-further-turning region.

Figure 10C:
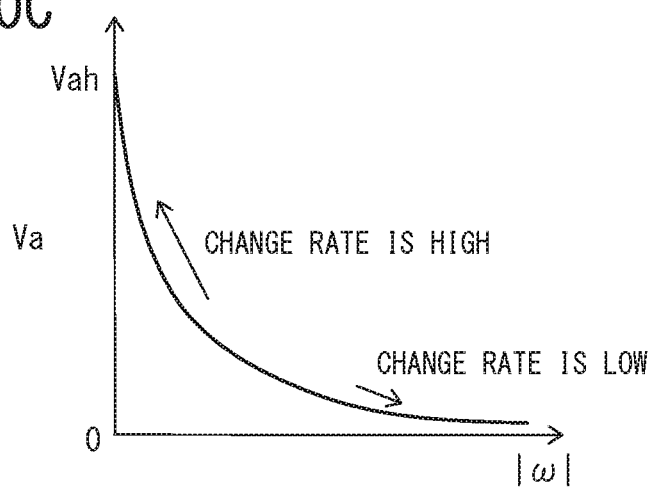

On the other hand, in the second steering-wheel-further-turning region, in a contrary manner to the case of the first steering-wheel-further-turning region, it is configured such that the adjustment value Va is made to rapidly change, following change in the angular velocity ω, in the direction toward the maximum adjustment value Vah to a certain extent and is strongly suppressed from changing in the direction toward the minimum adjustment value of 0, as illustrated in FIG. 10C.

Changing the adjustment value Va as described above causes the adjustment value Va to have a value close to the minimum adjustment value of 0 in the first steering-wheel-further-turning region and enables the control to be strongly performed in such a way that virtual stroke ends are generated at positions in the vicinities of the first threshold steering angles θtR1 and θtL1. On the other hand, in the second steering-wheel-further-turning region, since the adjustment value Va gradually coming close to the maximum adjustment value Vah causes the limitation on the end-abutting impact mitigation control to be gradually intensified, it becomes possible to increase the first steering angle θs to the maximum steering angle.

In the steering-wheel-returning region, since the adjustment value Va rapidly changes in the direction toward the minimum adjustment value of 0, it is possible to strongly perform the control in such a way that a virtual stroke end can be rapidly formed when the driver further turns the steering wheel again.

Alteration of the change rate of the adjustment value Va is specifically performed through rate limiting processing of limiting the change rate.

For example, the absolute value of a difference from a previous adjustment value is defined as a change amount ΔVa of the adjustment value Va, an upper limit ΔVamax is set for the change amount ΔVa, and, when the change amount ΔVa exceeds the upper limit ΔVamax, addition or subtraction is performed on the adjustment value Va in such a way that the change amount ΔVa coincides with the upper limit ΔVamax.

In the first steering-wheel-further-turning region and the steering-wheel-returning region, when the adjustment value Va increases, the upper limit ΔVamax is set at a smaller value in such a way that the change amount ΔVa has a smaller value. When the adjustment value Va decreases, the upper limit ΔVamax is set at a larger value in such a way that the change amount ΔVa has a larger value. Alternatively, the upper limit does not have to be set.

Conversely, in the second steering-wheel-further-turning region, when the adjustment value Va increases, the upper limit ΔVamax is set at a larger value in such a way that the change amount ΔVa has a larger value. Alternatively, the upper limit does not have to be set. When the adjustment value Va decreases, the upper limit ΔVamax is set at a smaller value in such a way that the change amount ΔVa has a smaller value.

Note that, in the rate limiting processing, it may be configured such that limitation is applied with an upper limit and a lower limit set for a difference itself instead of the absolute value of the difference. In addition, it may be configured such that limitation is applied with an upper limit (and a lower limit) set for a rate of change in the adjustment value Va (a ratio of the amount of increase or decrease from the previous adjustment value) instead of a change amount of the adjustment value Va.

Figure 11:
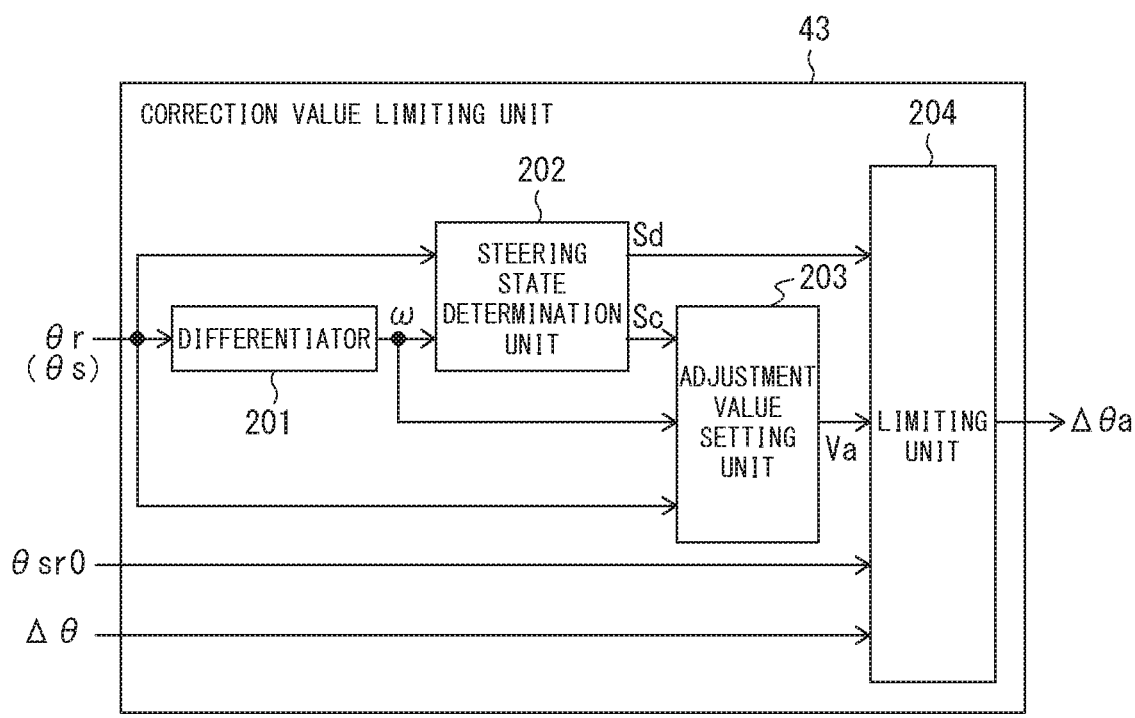
FIG. 11 is a block diagram illustrative of an example of a functional configuration of a correction value limiting unit of the first embodiment.

With reference to FIG. 11, an example of a functional configuration of the correction value limiting unit 43 will be described. The correction value limiting unit 43 includes a differentiator 201, a steering state determination unit 202, an adjustment value setting unit 203, and a limiting unit 204.

The differentiator 201 differentiates the control angle θr and thereby calculates an angular velocity ω of the first steering angle θs. The correction value limiting unit 43 may, in place of including the differentiator 201, acquire the angular velocity ω from the differentiator 62 of the end-abutting impact mitigation control unit 32.

The steering state determination unit 202 determines a steering state (the state of the driver further turning the steering wheel or the state of the driver returning the steering wheel) and a steering direction (the right steering or the left steering), using the control angle θr and the angular velocity ω. The steering state determination unit 202 determines that the driver further turns the steering wheel when the positive/negative signs of the control angle θr and the angular velocity ω coincide with each other. The steering state determination unit 202 determines that the driver returns the steering wheel when the positive/negative signs of the control angle θr and the angular velocity ω are different from each other. The steering state determination unit 202 determines that the right steering is performed when the control angle θr has a positive value and the left steering is performed when the control angle θr has a negative value.

The steering state determination unit 202 outputs a steering state signal Sc that indicates a result of the steering state determination and a steering direction signal Sd that indicates a result of the steering direction determination. Note that, in place of the control angle θr, the first steering angle θs may be used.

The adjustment value setting unit 203 determines an adjustment value Va, based on the control angle θr, the angular velocity ω, and the steering state signal Sc.

When the control angle θr is equal to or less than θrf and the steering state signal Sc indicates that "the driver further turns the steering wheel", the adjustment value setting unit 203 determines that steering is performed in the first steering-wheel-further-turning region and determines an adjustment value Va, based on the absolute value |ω| of the angular velocity ω and through the rate limiting processing in accordance with the characteristics illustrated in FIGS. 10A and 10B.

When the control angle θr exceeds θrf and the steering state signal Sc indicates that "the driver further turns the steering wheel", the adjustment value setting unit 203 determines that steering is performed in the second steering-wheel-further-turning region and determines an adjustment value Va, based on the absolute value |ω| of the angular velocity ω and through the rate limiting processing in accordance with the characteristics illustrated in FIGS. 10A and 10C.

When the steering state signal Sc indicates that "the driver returns the steering wheel", the adjustment value setting unit 203 determines that steering is performed in the steering-wheel-returning region and determines an adjustment value Va, based on the absolute value |ω| of the angular velocity ω and through the rate limiting processing in accordance with the characteristics illustrated in FIGS. 10A and 10B.

The adjustment value Va is input to the limiting unit 204 in conjunction with the steering direction signal Sd, the target steering angle θsr0, and the steering angle correction value Δθ.

When the steering direction signal Sd indicates the "right steering", the limiting unit 204 sets the right upper limit RUθ=(θsr0−θtR1)−Va, based on the target steering angle θsr0 and the adjustment value Va. The limiting unit 204 also sets the right lower limit RLθ=0. The limiting unit 204 limits the steering angle correction value Δθ, using the right upper limit RUθ and the right lower limit RLθ and outputs a steering angle correction value Δθ that is limited as a limited steering angle correction value Δθa.

When the steering direction signal Sd indicates the "left steering", the limiting unit 204 sets the left lower limit LLθ=(θsr0−θtL1)+Va, based on the target steering angle θsr0 and the adjustment value Va. The limiting unit 204 also sets the left upper limit LUθ=0. The limiting unit 204 limits the steering angle correction value Δθ, using the left lower limit LLθ and the left upper limit LUθ and outputs a steering angle correction value Δθ that is limited as a limited steering angle correction value Δθa.

Note that the limiting unit 204 may set the right upper limit RUθ and the left lower limit LLθ, based on the control angle θr in place of the target steering angle θsr0.

Figure 8B:
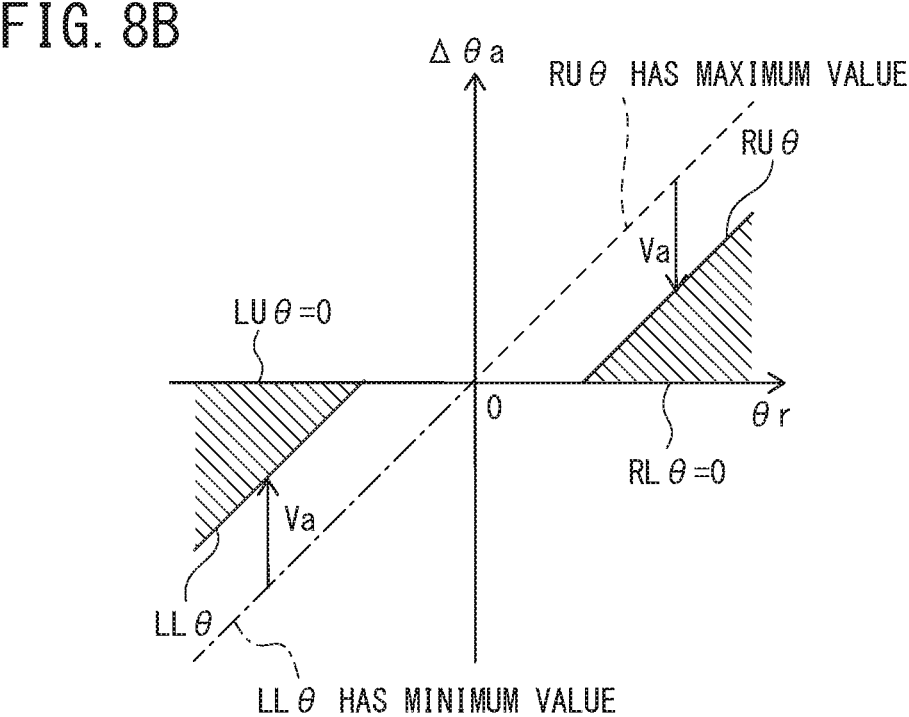

FIG. 8B is now referred to. The limiting unit 204 may subtract the adjustment value Va from the control angle θr and thereby calculate the right upper limit RUθ=θr−Va. When a calculation result of the calculation formula θr−Va of the right upper limit RUθ is less than 0, the limiting unit 204 sets the right upper limit RUθ at 0.

The limiting unit 204 may add the adjustment value Va to the control angle θr and thereby calculate the left lower limit LLθ=θr+Va. When a calculation result of the calculation formula θr+Va of the left lower limit LLθ is greater than 0, the limiting unit 204 sets the left lower limit LLθ at 0.

Setting the right upper limit RUθ and the left lower limit LLθ as described above causes the limited steering angle correction value Δθa to be set in such a way as not to return the target steering angle θsr0 beyond the first threshold steering angles θtR1 and θtL1 in the directions toward the neutral position.

Although a case where the minimum adjustment value is set at 0 was described above, the present embodiment is not limited to the case and the minimum adjustment value may be set at a value less than 0. When the absolute value of the angular velocity ω is large, the minimum adjustment value may be set at a value less than 0 in such a way that the angular velocity ω decelerates more rapidly and the target steering angle θsr0 may be corrected to steering angles beyond the first threshold steering angles θtR1 and θtL1 in the directions toward the neutral position.

The turning angle sensor 26, the steering angle sensor 14, the turning motor 22, the reaction force motor 21, and the torque sensor 10 are examples of a first steering angle detection unit, a second steering angle detection unit, a first actuator, a second actuator, and a reaction torque detection unit described in the claims, respectively.

The turning angle command value calculation unit 30 is an example of a target steering angle calculation unit and a target reaction force calculation unit described in the claims.

The control angle θr and the control angle calculation unit 31 are examples of steering angular displacement and a steering angular displacement calculation unit described in the claims, respectively.

The end-abutting impact mitigation control unit 32, the correction value limiting unit 43, the subtracter 33, and the turning angle control unit 34 are examples of a steering angle correction value calculation unit, a steering angle correction value limiting unit, a corrected target steering angle calculation unit, and a steering angle control unit described in the claims, respectively.

The spring constant table 60, the multipliers 61, 64, and 68, the differentiators 62 and 66, the viscosity coefficient table 63, the sign determination unit 65, the inertia coefficient table 67, and the adder 69 are an example of a turning torque calculation unit described in the claims.

The conversion coefficient table 70 and the multiplier 71 are an example of a first conversion unit described in the claims.

The reaction force correction coefficient table 54, the multiplier 55, and the adder 56 are an example of a target reaction force correction unit described in the claims.

(Operation)

Figure 12:
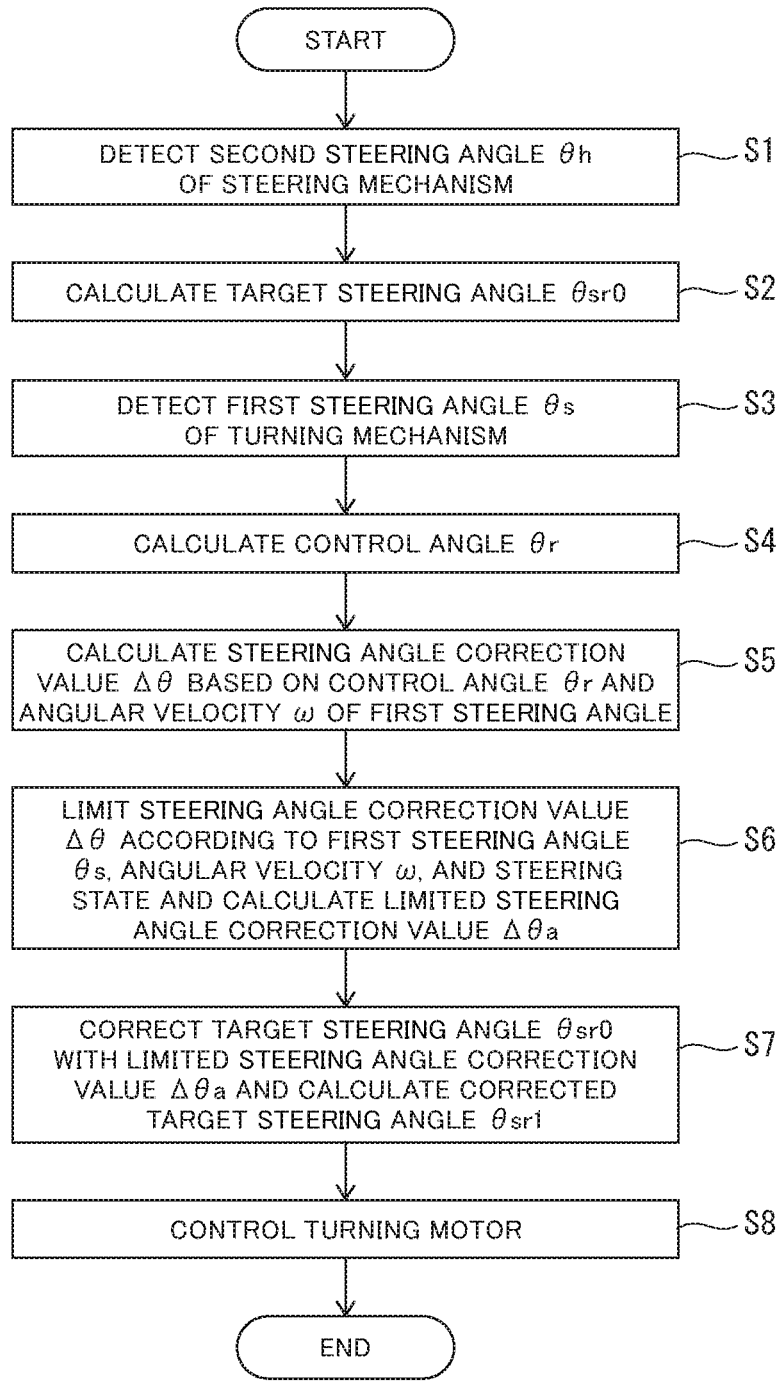
FIG. 12 is a flowchart of an example of a turning control method of the first embodiment.

Next, with reference to FIG. 12, a turning control method of the first embodiment will be described.

In step S1, the steering angle sensor 14 detects a second steering angle $\theta h$ of the steering mechanism.

In step S2, the turning angle command value calculation unit 30 calculates a target steering angle $\theta sr0$, based on at least the second steering angle $\theta h$.

In step S3, the turning angle sensor 26 detects a first steering angle $\theta s$ of the turning mechanism.

In step S4, the control angle calculation unit 31 calculates a steering angular displacement of the first steering angle $\theta s$ with a first threshold steering angle used as a reference as a control angle $\theta r$ when the first steering angle $\theta s$ is in a range from a positive first threshold steering angle to a positive maximum steering angle or the first steering angle $\theta s$ is in a range from a negative first threshold steering angle to a negative maximum steering angle.

In step S5, the end-abutting impact mitigation control unit 32 calculates a steering angle correction value $\Delta\theta$, based on the control angle $\theta r$ and angular velocity $\omega$ of the first steering angle $\theta s$.

In step S6, the correction value limiting unit 43 limits the steering angle correction value $\Delta\theta$ according to the first steering angle $\theta s$, the angular velocity $\omega$, and the steering state and thereby calculates a limited steering angle correction value $\Delta\theta a$. A flowchart of limiting processing of the steering angle correction value $\Delta\theta$ by the correction value limiting unit 43 will be described later.

In step S7, the subtracter 33 corrects the target steering angle $\theta sr0$ with the limited steering angle correction value $\Delta\theta a$ and thereby calculates a corrected target steering angle $\theta sr1$.

In step S8, the turning angle control unit 34 controls the turning motor 22 in such a way that the first steering angle $\theta s$ coincides with the corrected target steering angle $\theta sr1$. Subsequently, the process terminates.

Figure 13:
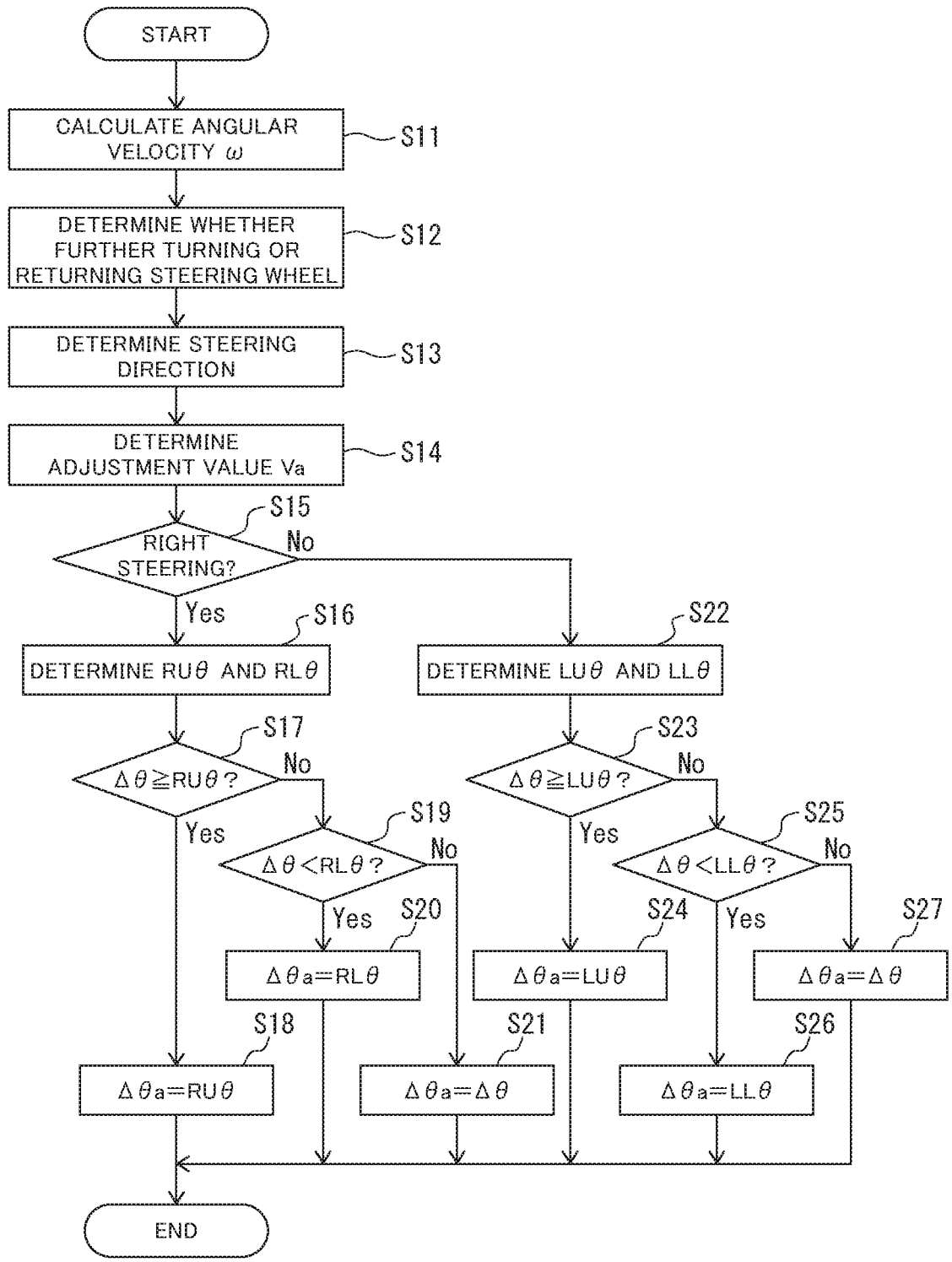
FIG. 13 is a flowchart of an example of limiting processing of the steering angle correction value by the correction value limiting unit.

With reference to FIG. 13, a flowchart of limiting processing of the steering angle correction value $\Delta\theta$ by the correction value limiting unit 43 will be described.

In step S11, the differentiator 201 calculates an angular velocity $\omega$ of the first steering angle $\theta s$.

In step S12, the steering state determination unit 202 determines whether the steering state is a state of the driver further turning the steering wheel or a state of the driver returning the steering wheel.

In step S13, the steering state determination unit 202 determines a steering direction.

In step S14, the adjustment value setting unit 203 determines an adjustment value Va, based on the control angle $\theta r$, the angular velocity $\omega$, and the steering state signal Sc.

In step S15, the limiting unit 204 determines whether or not the steering direction is the right steering, based on the steering direction signal Sd. When the steering direction is the right steering (step S15: Yes), the process proceeds to step S16. When the steering direction is the left steering (step S15: No), the process proceeds to step S22.

In step S16, the limiting unit 204 sets a right upper limit $RU\theta$ and a right lower limit $RL\theta$.

In step S17, the limiting unit 204 determines whether or not the steering angle correction value $\Delta\theta$ is equal to or greater than the right upper limit $RU\theta$. When the steering angle correction value $\Delta\theta$ is equal to or greater than the right upper limit $RU\theta$ (step S17: Yes), the process proceeds to step S18. When the steering angle correction value $\Delta\theta$ is not equal to or greater than the right upper limit $RU\theta$ (step S17: No), the process proceeds to step S19.

In step S18, the limiting unit 204 limits the steering angle correction value $\Delta\theta$ with the right upper limit $RU\theta$ and outputs the right upper limit $RU\theta$ as a limited steering angle correction value $\Delta\theta a$. Subsequently, the limiting processing of the steering angle correction value $\Delta\theta$ terminates.

In step S19, the limiting unit 204 determines whether or not the steering angle correction value $\Delta\theta$ is less than the right lower limit $RL\theta$.

When the steering angle correction value $\Delta\theta$ is less than the right lower limit $RL\theta$ (step S19: Yes), the process proceeds to step S20. When the steering angle correction value $\Delta\theta$ is not less than the right lower limit $RL\theta$ (step S19: No), the process proceeds to step S21.

In step S20, the limiting unit 204 limits the steering angle correction value $\Delta\theta$ with the right lower limit $RL\theta$ and outputs the right lower limit $RL\theta$ as a limited steering angle correction value $\Delta\theta a$. Subsequently, the limiting processing of the steering angle correction value $\Delta\theta$ terminates.

In step S21, the limiting unit 204 directly outputs the steering angle correction value $\Delta\theta$ without limitation as a limited steering angle correction value $\Delta\theta a$. Subsequently, the limiting processing of the steering angle correction value $\Delta\theta$ terminates.

On the other hand, in step S22, the limiting unit 204 sets a left upper limit $LU\theta$ and a left lower limit $LL\theta$.

In step S23, the limiting unit 204 determines whether or not the steering angle correction value $\Delta\theta$ is equal to or greater than the left upper limit $LU\theta$. When the steering angle correction value $\Delta\theta$ is equal to or greater than the left upper limit $LU\theta$ (step S23: Yes), the process proceeds to step S24. When the steering angle correction value $\Delta\theta$ is not equal to or greater than the left upper limit $LU\theta$ (step S23: No), the process proceeds to step S25.

In step S24, the limiting unit 204 limits the steering angle correction value $\Delta\theta$ with the left upper limit $LU\theta$ and outputs the left upper limit $LU\theta$ as a limited steering angle correction value $\Delta\theta a$. Subsequently, the limiting processing of the steering angle correction value $\Delta\theta$ terminates.

In step S25, the limiting unit 204 determines whether or not the steering angle correction value $\Delta\theta$ is less than the left lower limit $LL\theta$.

When the steering angle correction value $\Delta\theta$ is less than the left lower limit $LL\theta$ (step S25: Yes), the process proceeds to step S26. When the steering angle correction value $\Delta\theta$ is not less than the left lower limit $LL\theta$ (step S25: No), the process proceeds to step S27.

In step S26, the limiting unit 204 limits the steering angle correction value $\Delta\theta$ with the left lower limit $LL\theta$ and outputs the left lower limit $LL\theta$ as a limited steering angle correction value $\Delta\theta a$. Subsequently, the limiting processing of the steering angle correction value $\Delta\theta$ terminates.

In step S27, the limiting unit 204 directly outputs the steering angle correction value $\Delta\theta$ without limitation as a limited steering angle correction value $\Delta\theta a$. Subsequently, the limiting processing of the steering angle correction value $\Delta\theta$ terminates.

Advantageous Effects of First Embodiment (1) The turning control device includes the turning angle sensor 26 that detects the first steering angle $\theta s$ of the turning mechanism, the turning motor 22 that drives the turning mechanism, the steering angle sensor 14 that detects the second steering angle $\theta h$ of the steering mechanism, the turning angle command value calculation unit 30 that calculates the target steering angle $\theta sr0$ of the turning mechanism, based on at least the second steering angle $\theta h$, the control angle calculation unit 31 that, when the first steering angle $\theta s$ is in a range from a maximum steering angle that the first steering angle $\theta s$ can take to the first threshold steering angle, calculates the control angle $\theta r$ that is a steering angular displacement of the first steering angle $\theta s$ with the first threshold steering angle used as a reference, the end-abutting impact mitigation control unit 32 that calculates the steering angle correction value $\Delta\theta$ according to at least the control angle $\theta r$, the correction value limiting unit 43 that limits the steering angle correction value $\Delta\theta$ according to at least the steering state, the angular velocity $\omega$ of the first steering angle, and the first steering angle $\theta s$, the subtracter 33 that corrects the target steering angle $\theta sr0$ with the limited steering angle correction value $\Delta\theta a$ and thereby calculates a corrected target steering angle $\theta sr1$, and the turning angle control unit 34 that control the turning motor 22 $\theta sr1$.

Because of this configuration, in the turning device that control the first steering angle $\theta s$ of the turning mechanism, based on the target steering angle $\theta sr0$, it is possible to suppress increase in the first steering angle $\theta s$ when the rack 5b comes close to a stroke end and thereby suppress impact and hit sound (abnormal noise) due to end-abutting. In addition, by appropriately adjusting (limiting) the steering angle correction value $\Delta\theta$ for the target steering angle $\theta sr0$, it is possible to suppress the minimum turning radius of the vehicle from becoming large and the handling of the vehicle from deteriorating.

(2) The end-abutting impact mitigation control unit 32 includes the spring constant table 60 and the multiplier 61 that calculate a torque including the elastic torque $(K0 \cdot \theta r)$ based on the control angle $\theta r$ as the turning torque Tm to be exerted on the turning mechanism and the conversion coefficient table 70 and the multiplier 71 that convert the turning torque Tm to the steering angle correction value $\Delta\theta$.

This configuration enables change in the first steering angle $\theta s$ when reaction torque including the elastic torque $(K0 \cdot \theta r)$ acts on the turning mechanism to be reflected on the target steering angle $\theta sr0$. As a result, it is possible to suppress increase in the first steering angle $\theta s$ and thereby suppress impact and hit sound (abnormal noise) due to end-abutting.

(3) The end-abutting impact mitigation control unit 32 includes the spring constant table 60 and the multiplier 61 and the differentiator 62, the viscosity coefficient table 63, and the multiplier 64 that calculate, as the turning torque Tm, a torque including at least either the elastic torque $(K0 \cdot \theta r)$ based on the control angle $\theta r$ or the viscous torque $(\mu \cdot \omega)$ based on the angular velocity $\omega$ of the first steering angle $\theta s$ and the control angle $\theta r$ and the conversion coefficient table 70 and the multiplier 71 that convert the turning torque Tm to the steering angle correction value $\Delta\theta$.

This configuration enables change in the first steering angle $\theta s$ when reaction torque including at least either the elastic torque $(K0 \cdot \theta r)$ or the viscous torque $(\mu \cdot \omega)$ acts on the turning mechanism to be reflected on the target steering angle $\theta sr0$. As a result, it is possible to suppress increase in the first steering angle $\theta s$ and thereby suppress impact and hit sound (abnormal noise) due to end-abutting.

(4) The differentiators 62 and 66, the inertia coefficient table 67, and the multiplier 68 calculate an inertia torque $(\Delta J \cdot \alpha)$ based on the angular acceleration $\alpha$ of the first steering angle $\theta s$. The adder 69 adds the inertia torque $(\Delta J \cdot \alpha)$ to at least either the elastic torque $(K0 \cdot \theta r)$ or the viscous torque $(\mu \cdot \omega)$ and thereby calculates a turning torque Tm.

This configuration enables inertia torque in acceleration and deceleration of the first steering angle $\theta s$ to be adjusted.

(5) The conversion coefficient table 70 outputs a conversion coefficient $(1/Kb)$ depending on the vehicle speed Vh. The multiplier 71 converts the turning torque Tm, using the conversion coefficient $(1/Kb)$ and thereby calculates a steering angle correction value $\Delta\theta$.

This configuration enables road surface reaction force changing according to the vehicle speed Vh to be reflected on the steering angle correction value $\Delta\theta$.

(6) The turning angle command value calculation unit 30 calculates a target reaction force Thr that is applied to the steering mechanism, based on at least the second steering angle $\theta h$ and corrects the target reaction force Thr according to the steering angle correction value $\Delta\theta$. The reaction motor 21 applies reaction torque to the steering mechanism according to the target reaction force Thr corrected according to the steering angle correction value $\Delta\theta$.

This configuration enables the reaction torque to be increased when the end-abutting impact mitigation control is performed and the second steering angle $\theta h$ to be suppressed from increasing. In addition, notifying the driver of the rack 5b coming close to a stroke end enables the second steering angle $\theta h$ to be suppressed from increasing. As a result, it is possible to suppress the target steering angle $\theta sr0$ from increasing in directions toward the maximum steering angles and effectively generate virtual stroke ends of the rack 5b.

(First Variation)

The control angle calculation unit 31 may calculate a control angle $\theta r$, based on the second steering angle $\theta h$ of the steering mechanism. The same applies to the second embodiment, which will be described below. In this case, the control angle calculation unit 31 sets a second steering angle $\theta h$ of the steering mechanism corresponding to a maximum steering angle of the first steering angle $\theta s$ as a maximum steering angle that the second steering angle $\theta h$ can take. When the second steering angle $\theta h$ is in an angular range from the maximum steering angle to a first threshold steering angle, the control angle calculation unit 31 may calculate a steering angular displacement of the second steering angle $\theta h$ with the first threshold steering angle used as a reference as a control angle $\theta r$.

(Second Variation)

The correction value limiting unit 43 may limit the steering angle correction value $\Delta\theta$, based on, in place of the first steering angle $\theta s$, the second steering angle $\theta h$. The same applies to the second embodiment, which will be described below. For example, the differentiator 201 in FIG. 11 may calculate an angular velocity $\omega h$ of the second steering angle $\theta h$. The steering state determination unit 202 may determine a steering state and a steering direction, using the second steering angle $\theta h$ and the angular velocity $\omega h$.

The adjustment value setting unit 203 may determine an adjustment value Va, based on the second steering angle $\theta h$, the angular velocity ωh, and the steering state signal Sc. In so doing, the adjustment value setting unit 203 may define a "first steering-wheel-further-turning region", a "second steering-wheel-further-turning region", and a "steering-wheel-returning region" in a region of the second steering angle θh corresponding to the end-abutting impact mitigation control performance range of the first steering angle θs.

(Third Variation)

The control angle calculation unit 31 may alter the first threshold steering angle θtR1 or θtL1 when the first steering angle θs exceeds a predetermined second threshold steering angle. This configuration enables the first threshold steering angle θtR1 or θtL1, at which the end-abutting impact mitigation control is started, to be optimized. In the steering angle value to a physical rack end, production variations or variations occurring when a turning mechanism is mounted on a vehicle are included. A "rack end" means a state in which the rack 5b has reached a stroke end. A first threshold steering angle θtR1 or θtL1 that is set at a position excessively apart from a physical rack end in a direction toward the neutral position causes an excessive reaction force to be generated, which inhibits operation by the driver. There is a possibility that this inhibition causes the minimum turning radius to become large. Altering the first threshold steering angle θtR1 or θtL1 when the first steering angle θs exceeds a predetermined second threshold steering angle enables an excessive reaction force to be prevented from being generated and influence on the minimum turning radius to be reduced. The same applies to the second embodiment, which will be described below.

Figure 14:
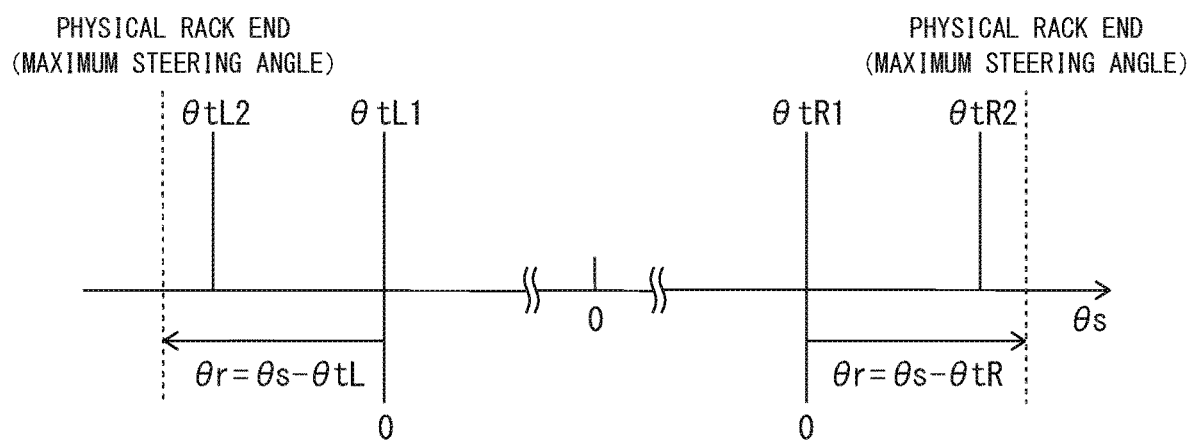
FIG. 14 is an explanatory diagram of an operation example of a control angle calculation unit in a variation.

FIG. 14 is now referred to. A positive second threshold steering angle θtR2 is set at a value larger than the positive first threshold steering angle θtR1, and a negative second threshold steering angle θtL2 is set at a value smaller than the negative first threshold steering angle θtL1. In other words, the absolute values |θtR2| and |θtL2| of the second threshold steering angles are larger than the absolute values |θtR1| and |θtL1| of the first threshold steering angles, respectively.

The control angle calculation unit 31 alters the positive first threshold steering angle θtR1 according to, for example, a difference (θs−θtR2) between the first steering angle θs and the second threshold steering angle θtR2 when the first steering angle θs becomes larger than the positive second threshold steering angle θtR2 (that is, when the absolute value |θs| becomes larger than the absolute value |θtR2|). For example, the control angle calculation unit 31 may set the sum of the difference (θs−θtR2) and the first threshold steering angle θtR1 as a new first threshold steering angle θtR1. For example, the control angle calculation unit 31 may alter the first threshold steering angle θtR1 when the difference (θs−θtR2) exceeds a predetermined value.

The control angle calculation unit 31 alters the negative first threshold steering angle θtL1 according to, for example, a difference (θs−θtL2) between the first steering angle θs and the second threshold steering angle θtL2 when the first steering angle θs becomes smaller than the negative second threshold steering angle θtL2 (that is, when the absolute value |θs| becomes larger than the absolute value |θtL2|). For example, the control angle calculation unit 31 may set the sum of the difference (θs−θtL2) and the first threshold steering angle θtL1 as a new first threshold steering angle θtL1. For example, the control angle calculation unit 31 may alter the first threshold steering angle θtL1 when the difference (θtR2−θs) exceeds a predetermined value.

Second Embodiment

A turning control device of a second embodiment sets a target angular velocity ωr0 of angular velocity ω of a first steering angle θs and performs angular velocity control in such a way that the angular velocity ω comes close to the target angular velocity ωr0 and, in conjunction therewith, performs end-abutting impact mitigation control that is similar to the above-described end-abutting impact mitigation control.

Turning torque Tm, which is exerted in a direction in which a turning mechanism is returned to a neutral position in the end-abutting impact mitigation control, includes an elastic torque component (K0·θr) and a viscous torque component (μ·ω), as expressed by the formula (3) above.

The elastic torque (K0·θr) is a component obtained by multiplying a control angle θr by a constant K0 and can be interpreted to be physical quantity having the same units as an angle.

On the other hand, the viscous torque (μ·ω) is a component obtained by multiplying angular velocity ω by a coefficient μ and can be interpreted to be physical quantity having the same units as angular velocity.

As such, a target steering angle θsr0 of the first steering angle θs is corrected by a steering angle correction value Δθ based on the elastic torque (K0·θr), and the target angular velocity ωr0 is corrected by an angular velocity correction value Δω based on the viscous torque (μ·ω).

Making the units of correction targets (that is, the target steering angle and the target angular velocity) the same as the units of correction amounts (that is, the elastic torque and the viscous torque) causes handling of the elastic torque and the viscous torque used for correction to be facilitated.

The second embodiment will be described in detail below. The turning device of the second embodiment has a configuration similar to that of the turning device of the first embodiment, and the same reference signs are assigned to the same constituent elements and overlapping description will be omitted.

Figure 15:
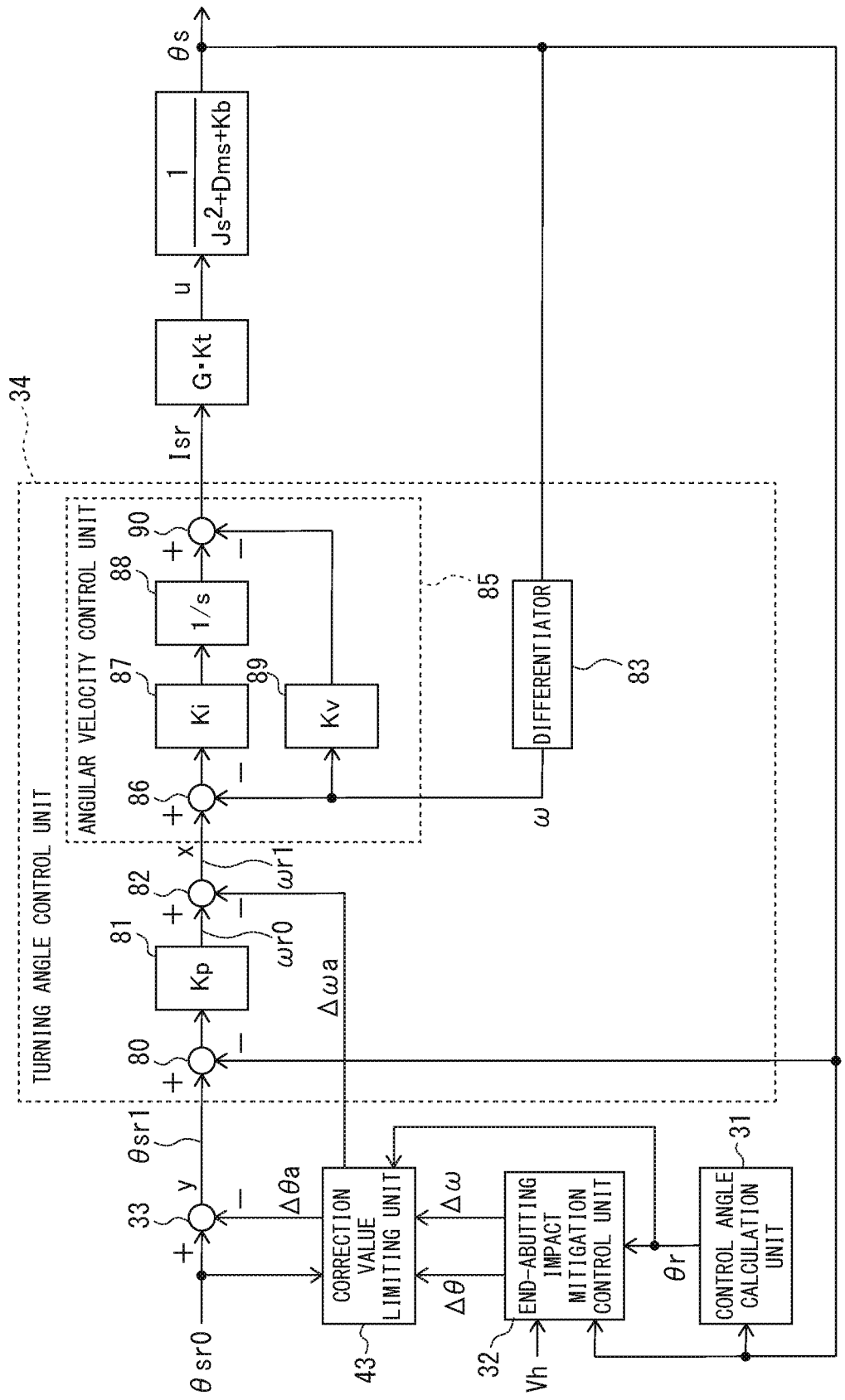
FIG. 15 is a block diagram illustrative of an example of a control system of a second embodiment.

FIG. 15 is a block diagram illustrative of an example of a control system of the second embodiment. In FIG. 15, a reference sign G denotes a gear ratio of a reduction gear 23, and a reference sign Kt denotes a torque constant of a turning motor 22.

An end-abutting impact mitigation control unit 32 of the second embodiment calculates a steering angle correction value Δθ for correcting the target steering angle θsr0 and an angular velocity correction value Δω for correcting the target angular velocity ωr0 in end-abutting impact mitigation. Details of the end-abutting impact mitigation control unit 32 of the second embodiment will be described later.

A correction value limiting unit 43, as with the first embodiment, limits the steering angle correction value Δθ according to at least a steering state, the first steering angle θs, and the angular velocity ω. The correction value limiting unit 43 outputs a steering angle correction value Δθ that is limited as a limited steering angle correction value Δθa.

Further, the correction value limiting unit 43 limits the angular velocity correction value Δω according to at least the steering state, the first steering angle θs, and the angular velocity ω. The correction value limiting unit 43 outputs an angular velocity correction value Δω that is limited as a limited angular velocity correction value Δωa.

A turning angle control unit 34 includes subtracters 80 and 82, a target angular velocity calculation unit 81, a differentiator 83, and an angular velocity control unit 85.

The target angular velocity calculation unit 81 multiplies deviation between a corrected target steering angle θsr1 and an actual first steering angle θs, which is output from the subtracter 80, by a constant Kp and thereby calculates a target angular velocity ωr0.

The subtracter 82, by subtracting the limited angular velocity correction value Δωa from the target angular velocity ωr0, which the target angular velocity calculation unit 81 calculated, corrects the target angular velocity ωr0 and obtains a corrected target angular velocity ωr1.

The differentiator 83 differentiates the first steering angle θs and thereby calculates an angular velocity ω. The differentiator 83 may be made to also serve as the differentiator 62 of the end-abutting impact mitigation control unit 32.

The angular velocity control unit 85 generates a current command value Isr for controlling the turning motor 22 in such a way that the angular velocity ω comes close to the corrected target angular velocity ωr1. The angular velocity control unit 85 includes subtracters 86 and 90, gain multiplication units 87 and 89, and an integrator 88.

The gain multiplication unit 87 multiplies deviation (ωr1−ω) between the angular velocity ω and the corrected target angular velocity ωr1, which is output from the subtracter 86, by a constant Ki. The integrator 88 integrates output from the gain multiplication unit 87.

The gain multiplication unit 89 multiplies the angular velocity ω by a constant Kv. The subtracter 90 calculates a difference obtained by subtracting output from the gain multiplication unit 89 from output from the integrator 88 as a current command value Isr.

Figure 16:
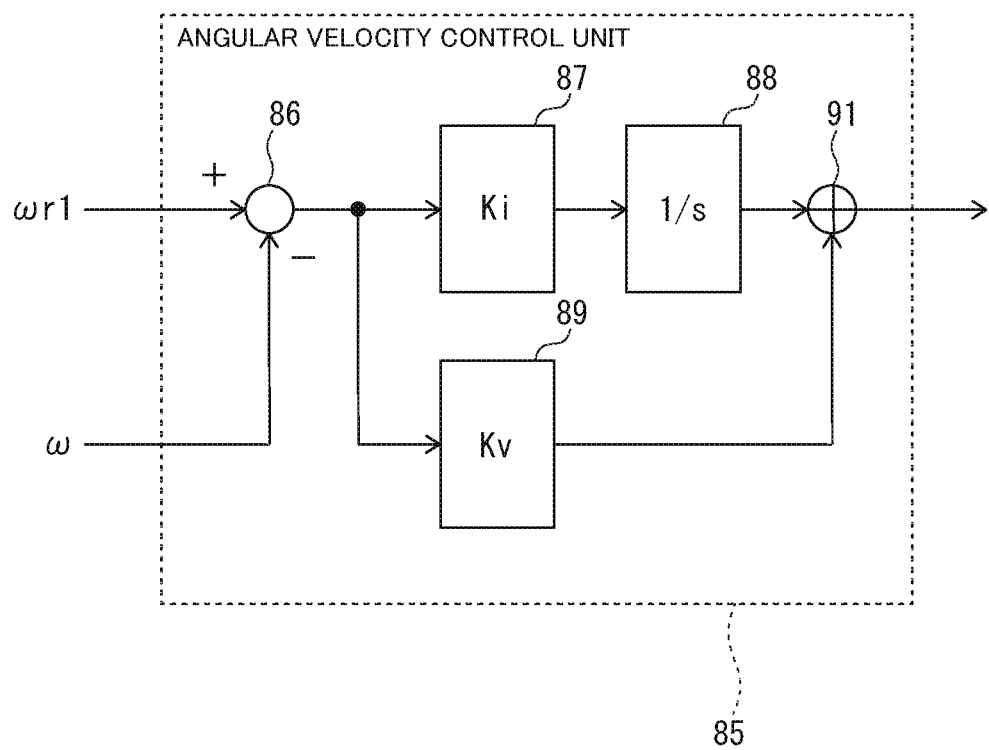
FIG. 16 is a block diagram of another functional configuration example of an angular velocity control unit illustrated in FIG. 15.

Another configuration example of the angular velocity control unit 85 is illustrated in FIG. 16. In this configuration example, the gain multiplication unit 89 multiplies the deviation (ωr1−ω) between the angular velocity ω and the corrected target angular velocity ωr1 by the constant Kv. An adder 91 calculates a sum of output from the integrator 88 and output from the gain multiplication unit 89 as a current command value Isr.

Next, a calculation method of a conversion coefficient for converting the viscous torque (μ·ω) to the angular velocity correction value Δω will be described.

FIG. 15 is now referred to. It is now assumed that characteristics of the turning mechanism, tires, and road surface reaction force are expressed by $1/(Js^2+Dms+Kb)$. When the characteristics of the road surface reaction force are excluded, characteristics from input u into the turning mechanism to the angular velocity ω of the first steering angle θs is expressed by the formula (5) below.

[Math 4]

$$\omega = \frac{1}{J \cdot s + Dm} u \quad (5)$$

When the input u is assumed to be a step input, a final value ω1 of the angular velocity ω is obtained as expressed by the formula (6) below.

[Math 5]

$$\omega 1 = \lim_{s \to 0} s \frac{1}{J \cdot s + Dm} u \frac{1}{s} = \frac{1}{Dm} u \quad (6)$$

On the other hand, characteristics from input x into the angular velocity control unit 85 to the angular velocity ω in FIG. 15 is expressed by the formula (7) below.

[Math 6]

$$\omega = \frac{Ki \cdot G \cdot Kt}{J \cdot s^2 + (Dm + Kv \cdot G \cdot Kt)s + (Kb + Ki \cdot G \cdot Kt)} x \quad (7)$$

When the input x is assumed to be a step input, a final value ω2 of the angular velocity ω is obtained as expressed by the formula (8) below.

[Math 7]

$$\omega 2 = \lim_{s \to 0} s \frac{Ki \cdot G \cdot Kt}{J \cdot s^2 + (Dm + Kv \cdot G \cdot Kt)s + (Kb + Ki \cdot G \cdot Kt)} x \frac{1}{s} \quad (8)$$
$$= \frac{Ki \cdot G \cdot Kt}{Kb + Ki \cdot G \cdot Kt} x$$

In the case of the angular velocity control unit 85 in FIG. 16, characteristics from input x to the angular velocity ω is expressed by the formula (9) below.

[Math 8]

$$\omega = \frac{(Ki + Kv \cdot s) \cdot G \cdot Kt}{J \cdot s^2 + (Dm + Kv \cdot G \cdot Kt)s + (Kb + Ki \cdot G \cdot Kt)} x \quad (9)$$

When the input x is assumed to be a step input, a final value ω2 of the angular velocity ω is obtained as expressed by the formula (10) below, which is the same result as the formula (8) above.

[Math 9]

$$\omega 2 = \lim_{s \to 0} s \frac{(Ki + Kv \cdot s) \cdot G \cdot Kt}{J \cdot s^2 + (Dm + Kv \cdot G \cdot Kt)s + (Kb + Ki \cdot G \cdot Kt)} x \frac{1}{s} \quad (10)$$
$$= \frac{Ki \cdot G \cdot Kt}{Kb + Ki \cdot G \cdot Kt} x$$

When it is now assumed that ω1=ω2, a relationship between the input x into the angular velocity control unit 85 and the input u into the turning mechanism is expressed by the formula (11) below.

[Math 10]

$$x = \frac{1}{Dm} \frac{Kb + Ki \cdot G \cdot Kt}{Ki \cdot G \cdot Kt} u \quad (11)$$

Therefore, in order to input the viscous torque component (μ·ω) to the turning mechanism in the end-abutting impact mitigation control, it is only required to calculate a product obtained by multiplying the viscous torque component (μ·ω) by a conversion coefficient (Kb+Ki·G·Kt)/(Dm·Ki·G·Kt) as an angular velocity correction value Δω and correct the target angular velocity ωr0 with the angular velocity correction value Δω.

Note that, when Ki·G·Kt is sufficiently large compared with a spring constant Kb, (1/Dm), which is obtained by neglecting the spring constant Kb, may be used as the conversion coefficient. Alternatively, an average value or an intermediate value between (Kb+Ki·G·Kt)/(Dm·Ki·G·Kt) and (1/Dm) may be used as the conversion coefficient.

Since the spring constant Kb changes according to vehicle speed Vh, the conversion coefficient may be altered according to the vehicle speed Vh.

Further, the conversion coefficient may be switched between a conversion coefficient for the case of the driver returning the steering wheel and a conversion coefficient for the case of the driver further turning the steering wheel. For example, it may be configured such that, while the driver is returning the steering wheel, the conversion coefficient (Kb+Ki·G·Kt)/(Dm·Ki·G·Kt) with the spring constant Kb taken into consideration is used and, while the driver further turning the steering wheel, the conversion coefficient (1/Dm) is used.

Since, when the driver returns the steering wheel, a direction in which steering force is applied and a steering direction are different, the steering becomes difficult due to returning force caused by actual spring force Kb·θ. Thus, when the driver returns the steering wheel, the target steering angle may be corrected in a direction opposite to the steering direction.

On the other hand, characteristics from input y into the turning angle control unit 34 to the first steering angle θs in FIG. 15 is expressed by the formula (12) below.

[Math 11]

$$\theta s = \frac{Kp \cdot Ki \cdot G \cdot Kt}{J \cdot s^3 + (Dm + Kv \cdot G \cdot Kt) \cdot s^2 + (Kb + Ki \cdot G \cdot Kt) \cdot s + Kp \cdot Ki \cdot G \cdot Kt} y \quad (12)$$

In the case of the turning angle control unit 34 in FIG. 16, characteristics from input y to the first steering angle θs is expressed by the formula (13) below. In the formula (13), G·Kt is replace with GK.

[Math 12]

$$\theta s = \frac{Kp \cdot (Ki + Kv \cdot s) \cdot GK}{J \cdot s^3 + (Dm + Kv \cdot GK) \cdot s^2 + (Kb + Kp \cdot Kv \cdot GK + Ki \cdot GK) \cdot s + Kp \cdot Ki \cdot GK} y \quad (13)$$

When it is assumed that the input y is a step input, a final value θ1 of the first steering angle θs becomes θ1=y in both cases of the formulae (12) and (13).

On the other hand, a final value θ2 of the first steering angle θs when the input u is input to the physical model of the turning mechanism, the tires, and the road surface reaction force is obtained as expressed by the formula (14) below.

[Math 13]

$$\theta 2 = \lim_{s \to 0} s \frac{1}{J \cdot s^2 + Dm \cdot s + Kbs} \frac{1}{s} u = \frac{1}{Kb} u \quad (14)$$

When it is now assumed that θ1=θ2, a relationship between the input y into the turning angle control unit 34 and the input u into the turning mechanism is expressed by y=u/Kb.

Therefore, in order to input the elastic torque component (K0·θr) to the turning mechanism in the end-abutting impact mitigation control, it is only required to calculate a product obtained by multiplying the elastic torque component (K0·θr) by a conversion coefficient 1/Kb as a steering angle correction value Δθ and correct the target steering angle θsr0 with the steering angle correction value Δθ. As with the first embodiment, an inertia torque component (ΔJ·α) may be added to the elastic torque component (K0·θr) and the sum thereof may be input to the turning mechanism.

Figure 17:
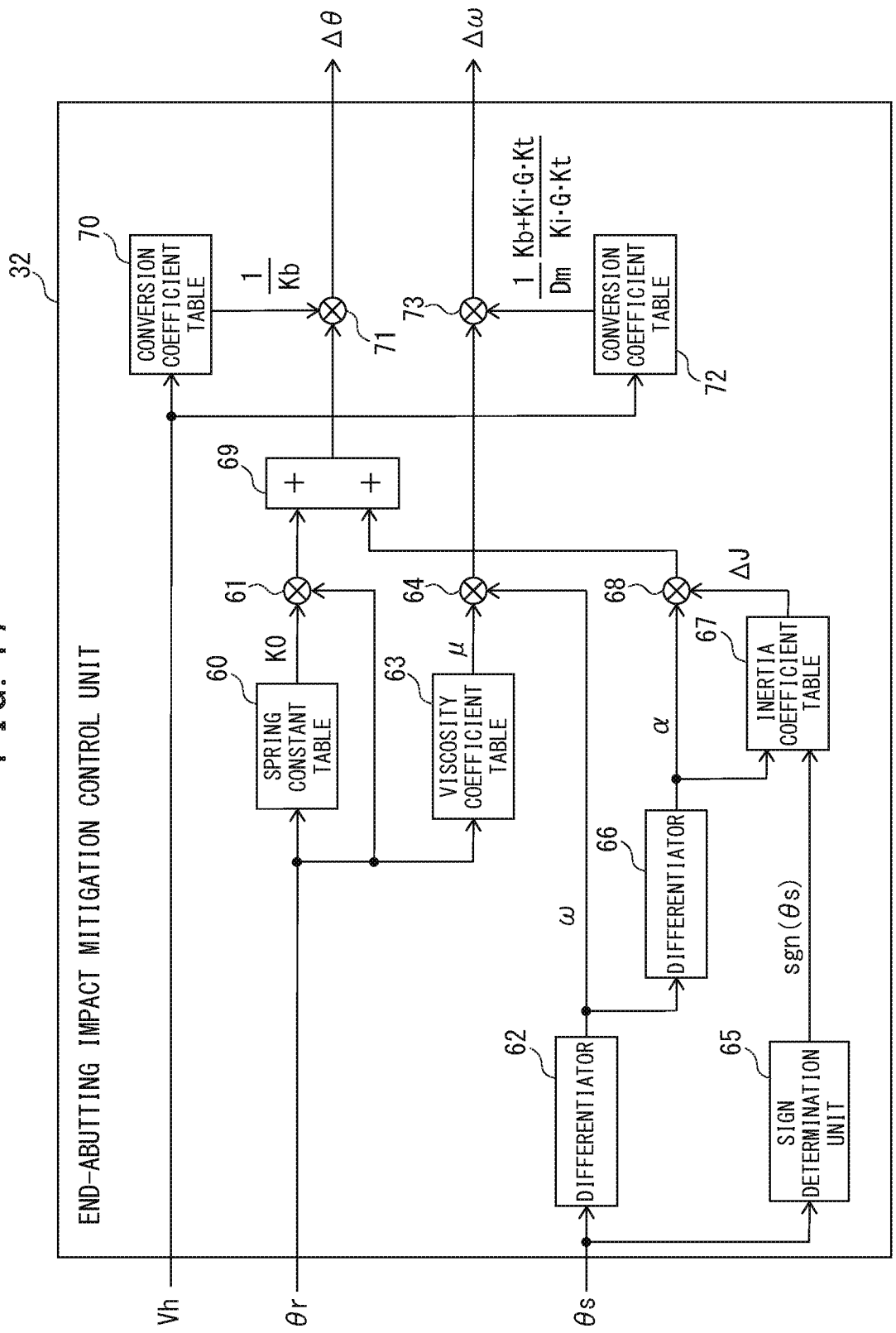
FIG. 17 is a block diagram illustrative of an example of a functional configuration of an end-abutting impact mitigation control unit of the second embodiment.

With reference to FIG. 17, a configuration of the end-abutting impact mitigation control unit 32 of the second embodiment will be described below. The end-abutting impact mitigation control unit 32 of the second embodiment has a configuration similar to that of the end-abutting impact mitigation control unit 32 of the first embodiment, and the same reference signs are assigned to the same constituent elements and overlapping description will be omitted.

The end-abutting impact mitigation control unit 32 of the second embodiment further includes a conversion coefficient table 72 and a multiplier 73.

The conversion coefficient table 72 outputs a conversion coefficient (Kb+Ki·G·Kt)/(Dm·Ki·G·Kt) for converting the viscous torque component (μ·ω) output from a multiplier 64 to the angular velocity correction value Δω. Since, as described above, the spring constant Kb changes according to the vehicle speed Vh, the conversion coefficient table 72 may output the conversion coefficients (Kb+Ki·G·Kt)/(Dm·Ki·G·Kt) that changes according to the vehicle speed Vh.

When Ki·G·Kt is sufficiently large compared with the spring constant Kb, the conversion coefficient table 72 may use (1/Dm), which is obtained by neglecting the spring constant Kb, as the conversion coefficient. Alternatively, an average value or an intermediate value between (Kb+Ki·G·Kt)/(Dm·Ki·G·Kt) and (1/Dm) may be used as the conversion coefficient.

Further, the conversion coefficient table 72 may switch the conversion coefficient between a conversion coefficient for the case of the driver returning the steering wheel and a conversion coefficient for the case of the driver further turning the steering wheel. For example, it may be configured such that, while the driver is returning the steering wheel, the conversion coefficient table 72 may output the conversion coefficient (Kb+Ki·G·Kt)/(Dm·Ki·G·Kt) with the spring constant Kb taken into consideration and, while the driver is further turning the steering wheel, the conversion coefficient table 72 may output the conversion coefficient (1/Dm).

The multiplier 73 multiplies the viscous torque component (μ·ω) by the conversion coefficient (Kb+Ki·G·Kt)/(Dm·Ki·G·Kt) output from the conversion coefficient table 72 and thereby converts the viscous torque component (μ·ω) to the angular velocity correction value Δω.

On the other hand, an adder 69 calculates a sum of the elastic torque component (K0·θr) and the inertia torque component (ΔJ·α), with the viscous torque component (μ·ω) excluded from the turning torque Tm in the formula (3) above.

A multiplier 71 multiplies the sum (K0·θr+ΔJ·α) of the elastic torque component and the inertia torque component by the conversion coefficient 1/Kb output from the conversion coefficient table 70 and thereby converts the sum of the elastic torque component and the inertia torque component to the steering angle correction value Δθ.

Note that the inertia torque component (ΔJ·α) is not necessarily essential and a sign determination unit 65, a differentiator 66, an inertia coefficient table 67, and a multiplier 68 may be omitted.

Figure 18:
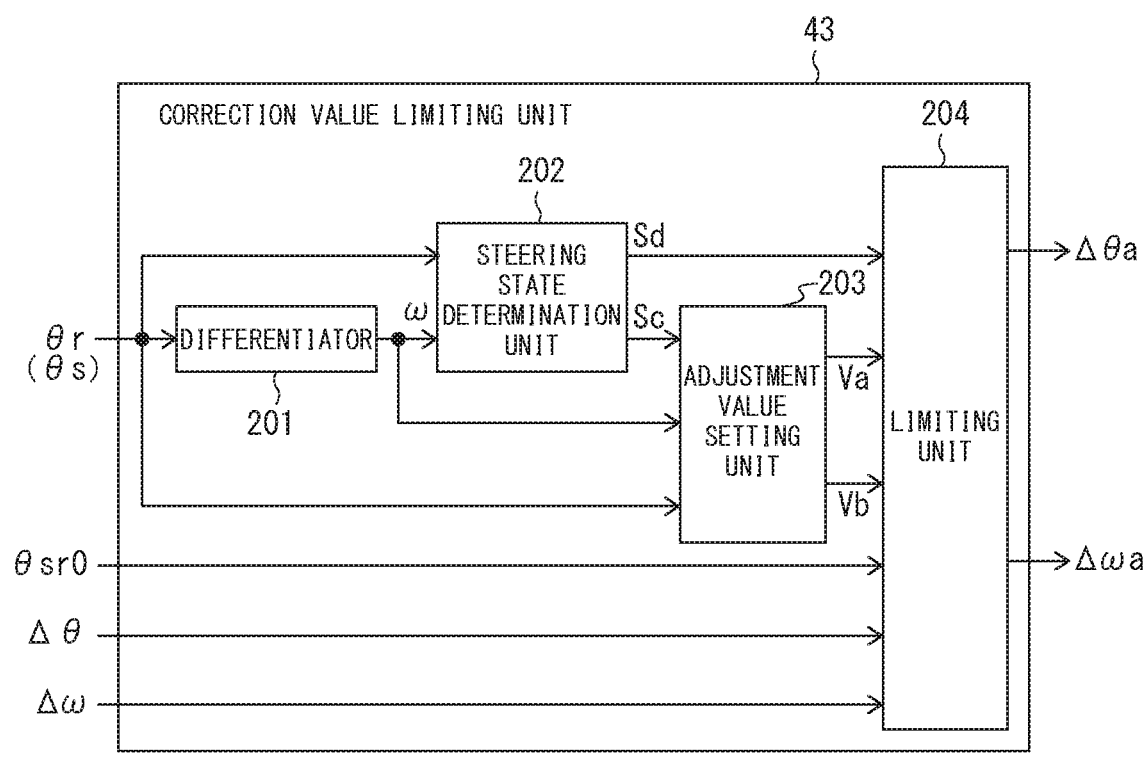
FIG. 18 is a block diagram illustrative of an example of a functional configuration of a correction value limiting unit of the second embodiment.

With reference to FIG. 18, a configuration of the correction value limiting unit 43 of the second embodiment will be described below. The correction value limiting unit 43 of the second embodiment has a configuration similar to that of the correction value limiting unit 43 of the first embodiment, and the same reference signs are assigned to the same constituent elements and overlapping description will be omitted.

An adjustment value setting unit 203, as with the adjustment value setting unit 203 of the first embodiment, determines an adjustment value Va. A limiting unit 204, as with the limiting unit 204 of the first embodiment, limits the steering angle correction value $\Delta\theta$ and outputs a steering angle correction value $\Delta\theta$ that is limited as a limited steering angle correction value $\Delta\theta a$.

Further, the correction value limiting unit 43 of the second embodiment sets an upper limit $RU\omega$ of the angular velocity correction value $\Delta\omega$ in the case of the right steering (hereinafter, referred to as "right upper limit $RU\omega$") and a lower limit $LL\omega$ of the angular velocity correction value $\Delta\omega$ in the case of the left steering (hereinafter, referred to as "left lower limit $LL\omega$"), based on the steering state, the first steering angle $\theta s$, the angular velocity $\omega$, and the target steering angle $\theta sr0$.

When adjustment value setting unit 203 sets the right upper limit $RU\omega$ and the left lower limit $LL\omega$, the adjustment value setting unit 203 sets an adjustment value Vb, based on the steering state, the first steering angle $\theta s$, and the angular velocity $\omega$.

Figure 19A:
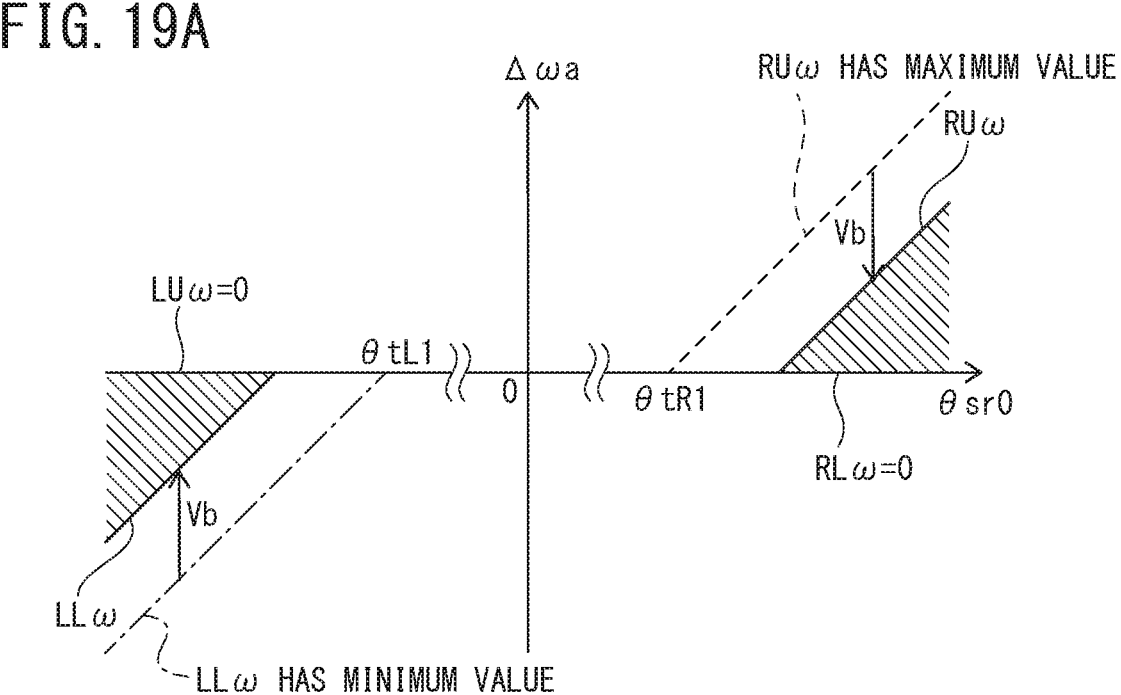
FIGS. 19A and 19B are explanatory diagrams of an upper limit and a lower limit of an angular velocity correction value, respectively.

FIG. 19A is now referred to. The limiting unit 204 multiplies a difference $(\theta sr0-\theta tR1)$ that is obtained by subtracting the positive first threshold steering angle $\theta tR1$ from the target steering angle $\theta sr0$ by the above-described constant Kp (see FIG. 15) and subtracts the adjustment value Vb from the product $Kp\times(\theta sr0-\theta tR1)$ and thereby calculates the right upper limit $RU\omega=Kp\times(\theta sr0-\theta tR1)-Vb$. The right upper limit $RU\omega$ has a maximum value as illustrated by a dashed line when the adjustment value Vb=0.

When a calculation result of the calculation formula $Kp\times(\theta sr0-\theta tR1)-Vb$ of the right upper limit $RU\omega$ is less than 0, the limiting unit 204 sets the right upper limit $RU\omega$ at 0.

A lower limit $RL\omega$ of the angular velocity correction value $\Delta\omega$ in the case of the right steering (hereinafter, referred to as "right lower limit $RL\omega$") is set at 0.

In the case of the right steering, the limiting unit 204 outputs a value obtained by limiting the angular velocity correction value $\Delta\omega$ within a range bounded by the right lower limit $RL\omega$ and the right upper limit $RU\omega$ (a hatched range) as a limited angular velocity correction value $\Delta\omega a$.

On the other hand, the limiting unit 204 multiplies a difference $(\theta sr0-\theta tL1)$ that is obtained by subtracting the negative first threshold steering angle $\theta tL1$ from the target steering angle $\theta sr0$ by the constant Kp and adds the adjustment value Vb to the product $Kp\times(\theta sr0-\theta tL1)$ and thereby calculates the left lower limit $LL\omega=Kp\times(\theta sr0-\theta tL1)+Vb$. The left lower limit $LL\omega$ has a minimum value (the absolute value thereof has a maximum value) as illustrated by an alternate long and short dash line when the adjustment value Vb=0.

When a calculation result of the calculation formula $Kp\times(\theta sr0-\theta tL1)+Vb$ of the left lower limit $LL\omega$ is greater than 0, the limiting unit 204 sets the left lower limit $LL\omega$ at 0.

An upper limit $LU\omega$ of the angular velocity correction value $\Delta\omega$ in the case of the left steering (hereinafter, referred to as "left upper limit $LU\omega$") is set at 0.

In the case of the left steering, the limiting unit 204 outputs a value obtained by limiting the angular velocity correction value $\Delta\omega$ within a range bounded by the left lower limit $LL\omega$ and the left upper limit $LU\omega$ (a hatched range) as a limited angular velocity correction value $\Delta\omega a$.

Note that the limiting unit 204 may set the right upper limit $RU\omega$ and the left lower limit $LL\omega$, based on the control angle $\theta r$ in place of the target steering angle $\theta sr0$.

Figure 19B:
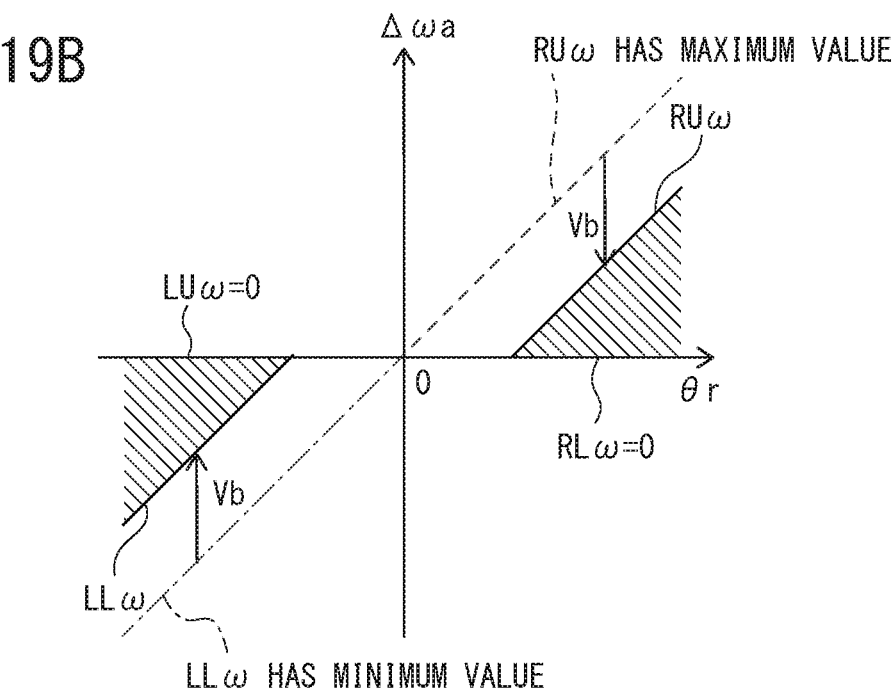

FIG. 19B is now referred to. The limiting unit 204 may subtract the adjustment value Vb from the product of the control angle $\theta r$ and the constant Kp and thereby calculate the right upper limit $RU\omega=Kp\times\theta r-Vb$. When a calculation result of the calculation formula $Kp\times\theta r-Vb$ of the right upper limit $RU\omega$ is less than 0, the limiting unit 204 sets the right upper limit $RU\omega$ at 0.

The limiting unit 204 may add the adjustment value Vb to the product of the control angle $\theta r$ and the constant Kp and thereby calculate the left lower limit $LL\omega=Kp\times\theta r+Vb$. When a calculation result of the calculation formula $Kp\times\theta r+Vb$ of the left lower limit $LL\omega$ is greater than 0, the limiting unit 204 sets the left lower limit $LL\omega$ at 0.

Next, a setting method of the adjustment value Vb by the adjustment value setting unit 203 will be described. The adjustment value Vb is set based on the steering state, the first steering angle $\theta s$, and the angular velocity $\omega$ of the first steering angle $\theta s$.

The adjustment value Vb is set to be variable with respect to the magnitude (absolute value) $|\omega|$ of the angular velocity $\omega$ of the first steering angle $\theta s$. When the absolute value $|\omega|$ is small, the adjustment value Vb is set to be large in such a way that severe limitation is applied to the end-abutting impact mitigation control by the correction value limiting unit 43, and, as the absolute value $|\omega|$ becomes larger, the adjustment value Vb is set to be small in such a way that the limitation is reduced.

Figure 20A:
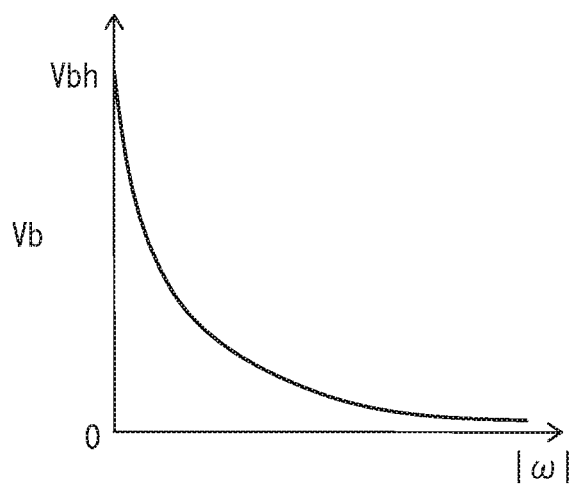
FIG. 20A is a characteristic diagram of an example of an adjustment value Vb.

FIG. 20A is now referred to. The maximum value (hereinafter, referred to as "maximum adjustment value") and the minimum value (hereinafter, referred to as "minimum adjustment value") of the adjustment value Vb are set at Vbh and 0, respectively, and the adjustment value Vb is set in such a way that, when the magnitude of the steering velocity $\omega$ is zero, the adjustment value Vb coincides with the maximum adjustment value Vbh and, as the magnitude of the steering velocity $\omega$ becomes larger, the adjustment value Vb asymptotically approaches 0.

Further, the change rate of the adjustment value Vb, which follows change in the angular velocity $\omega$, is changed depending on in which one of the "first steering-wheel-further-turning region", the "second steering-wheel-further-turning region", and the "steering-wheel-returning region" described above the first steering angle $\theta s$ or the control angle $\theta r$ are included.

Figure 20B:
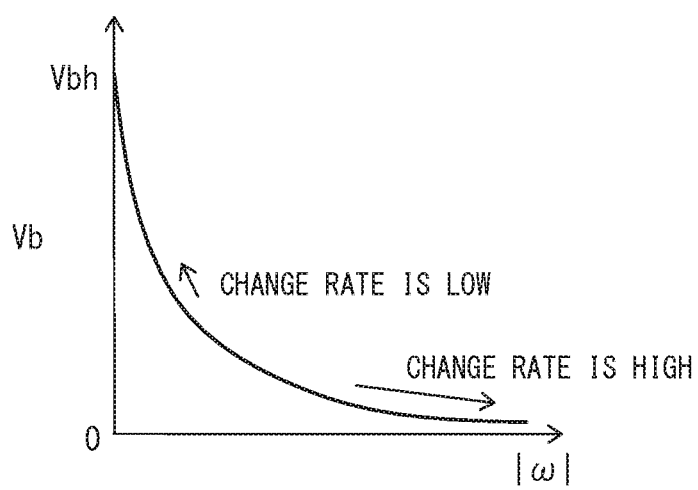
FIGS. 20B and 20C are explanatory diagrams of examples of rates of change in the adjustment value Vb.

In other words, in the first steering-wheel-further-turning region, it is configured such that the adjustment value Vb is strongly suppressed from changing in a direction toward the maximum adjustment value Vbh even when the angular velocity $\omega$ becomes slow and, when the angular velocity $\omega$ is fast, the adjustment value Vb is made to change in a direction toward the minimum adjustment value of 0 sufficiently rapidly, as illustrated in FIG. 20B.

In the steering-wheel-returning region, the adjustment value Vb is made to change in a similar manner to the first steering-wheel-further-turning region.

Figure 20C:
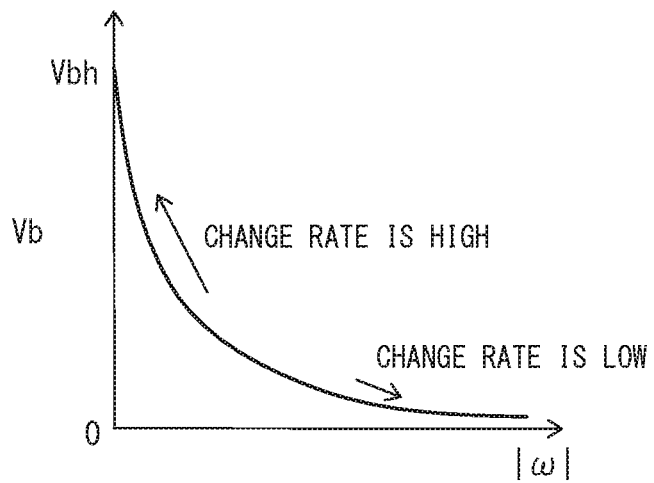

On the other hand, in the second steering-wheel-further-turning region, in a contrary manner to the case of the first steering-wheel-further-turning region, it is configured such that the adjustment value Vb is made to rapidly change, following change in the angular velocity ω, in the direction toward the maximum adjustment value Vbh to a certain extent and is strongly suppressed from changing in the direction toward the minimum adjustment value of 0, as illustrated in FIG. 20C.

Changing the adjustment value Vb as described above causes the adjustment value Vb to have a value close to the minimum adjustment value of 0 in the first steering-wheel-further-turning region and enables the control to be strongly performed in such a way that virtual stroke ends are generated at positions in the vicinities of the first threshold steering angles θtR1 and θtL1. On the other hand, in the second steering-wheel-further-turning region, since the adjustment value Vb gradually coming close to the maximum adjustment value Vbh causes the limitation on the end-abutting impact mitigation control to be gradually intensified, it becomes possible to increase the first steering angle θs to the maximum steering angle.

In the steering-wheel-returning region, since the adjustment value Vb rapidly changes in the direction toward the minimum adjustment value of 0, it is possible to strongly perform the control in such a way that a virtual stroke end can be rapidly formed when the driver further turns the steering wheel again.

The adjustment value setting unit 203, as with the case of the adjustment value Va, alters the change rate of the adjustment value Vb through the rate limiting processing.

The differentiator 62, a viscosity coefficient table 63, the multiplier 64, the conversion coefficient table 72, and the multiplier 73 are an example of an angular velocity correction value calculation unit described in the claims. The correction value limiting unit 43 is an example of an angular velocity correction value limiting unit described in the claims. The subtracter 82 is an example of a corrected target angular velocity calculation unit described in the claims. The differentiator 62, the viscosity coefficient table 63, and the multiplier 64 are an example of a viscous torque calculation unit described in the claims. The conversion coefficient table 72 and the multiplier 73 are an example of a second conversion unit described in the claims.

(Operation)

Figure 21:
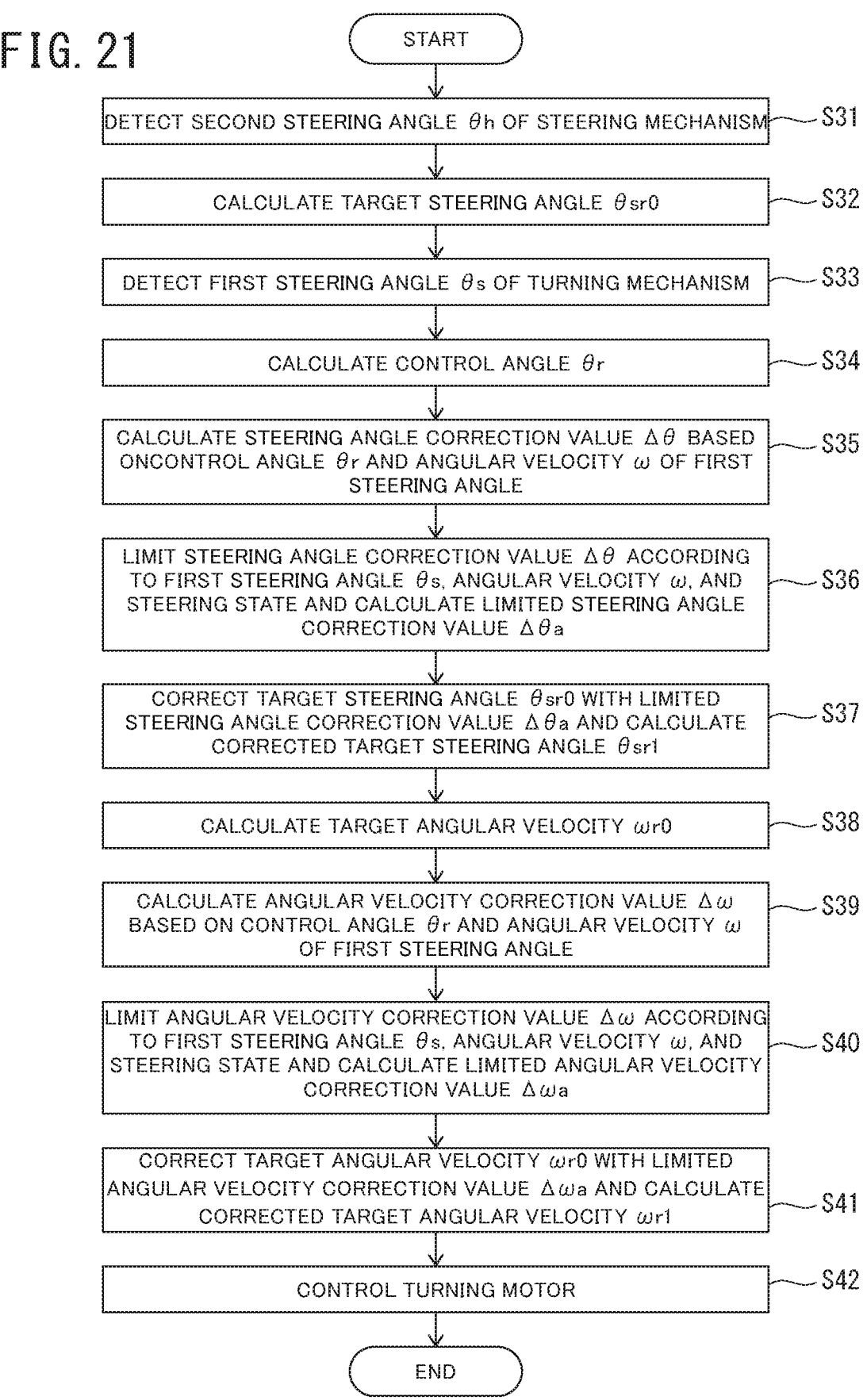
FIG. 21 is a flowchart of an example of a turning control method of the second embodiment.

Next, with reference to FIG. 21, a turning control method of the second embodiment will be described.

Processing in steps S31 to S37 are the same as steps S1 to S7 that were described with reference to FIG. 12.

In step S38, the target angular velocity calculation unit 81 multiplies deviation between the corrected target steering angle θsr1 and the actual first steering angle θs by the constant Kp and thereby calculates a target angular velocity ωr0.

In step S39, the differentiator 62, the viscosity coefficient table 63, the multiplier 64, the conversion coefficient table 72, and the multiplier 73 calculate an angular velocity correction value Δω, based on the control angle θr and the angular velocity ω of the first steering angle θs.

In step S40, the correction value limiting unit 43 limits the angular velocity correction value Δω according to the first steering angle θs, the angular velocity ω, and the steering state and thereby calculates a limited angular velocity correction value Δωa. A flowchart of limiting processing of the angular velocity correction value Δω by the correction value limiting unit 43 will be described later.

In step S41, the subtracter 82 corrects the target angular velocity ωr0 with the limited angular velocity correction value Δωa and thereby calculates a corrected target angular velocity ωr1.

In step S42, the turning angle control unit 34 controls the turning motor 22 in such a way that the first steering angle θs coincides with the corrected target steering angle θsr1. In this step, the angular velocity control unit 85 of the turning angle control unit 34 controls the turning motor 22 in such a way that the angular velocity ω of the first steering angle θs coincides with the corrected target angular velocity ωr1. Subsequently, the process terminates.

Figure 22:
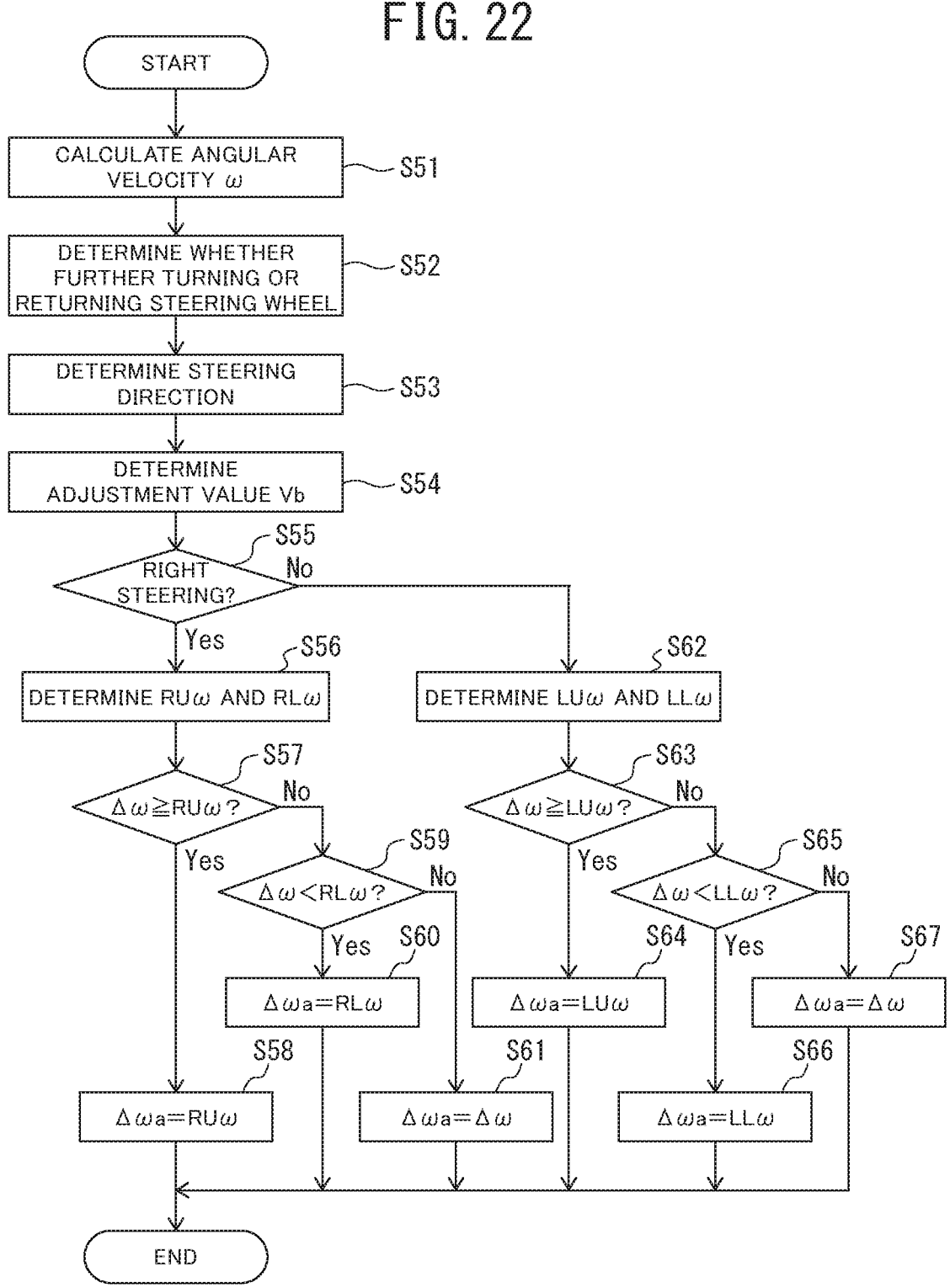
FIG. 22 is a flowchart of an example of limiting processing of the angular velocity correction value by the correction value limiting unit.

With reference to FIG. 22, a flowchart of limiting processing of the angular velocity correction value Δω by the correction value limiting unit 43 will be described.

Processing in steps S51 to S53 are the same as steps S11 to S13 that were described with reference to FIG. 13.

In step S54, the adjustment value setting unit 203 determines an adjustment value Vb, based on the control angle θr, the angular velocity ω, and the steering state signal Sc.

In step S55, the limiting unit 204 determines whether or not the steering direction is the right steering, based on the steering direction signal Sd. When the steering direction is the right steering (step S55: Yes), the process proceeds to step S56. When the steering direction is the left steering (step S55: No), the process proceeds to step S62.

In step S56, the limiting unit 204 sets a right upper limit RUω and a right lower limit RLω.

In step S57, the limiting unit 204 determines whether or not the angular velocity correction value Δω is equal to or greater than the right upper limit RUω. When the angular velocity correction value Δω is equal to or greater than the right upper limit RUω (step S57: Yes), the process proceeds to step S58. When the angular velocity correction value Δω is not equal to or greater than the right upper limit RUω (step S57: No), the process proceeds to step S59.

In step S58, the limiting unit 204 limits the angular velocity correction value Δω with the right upper limit RUω and outputs the right upper limit RUω as a limited angular velocity correction value Δωa. Subsequently, the limiting processing of the angular velocity correction value Δω terminates.

In step S59, the limiting unit 204 determines whether or not the angular velocity correction value Δω is less than the right lower limit RLω.

When the angular velocity correction value Δω is less than the right lower limit RLω (step S59: Yes), the process proceeds to step S60. When the angular velocity correction value Δω is not less than the right lower limit RLω (step S59: No), the process proceeds to step S61.

In step S60, the limiting unit 204 limits the angular velocity correction value Δω with the right lower limit RLω and outputs the right lower limit RLω as a limited angular velocity correction value Δωa. Subsequently, the limiting processing of the angular velocity correction value Δω terminates.

In step S61, the limiting unit 204 directly outputs the angular velocity correction value Δω without limitation as a limited angular velocity correction value Δωa. Subsequently, the limiting processing of the angular velocity correction value Δω terminates.

On the other hand, in step S62, the limiting unit 204 sets a left upper limit LUω and a left lower limit LLω.

In step S63, the limiting unit 204 determines whether or not the angular velocity correction value Δω is equal to or greater than the left upper limit LUω. When the angular velocity correction value Δω is equal to or greater than the left upper limit LUω (step S63: Yes), the process proceeds to step S64. When the angular velocity correction value Δω is not equal to or greater than the left upper limit LUω (step S63: No), the process proceeds to step S65.

In step S64, the limiting unit 204 limits the angular velocity correction value Δω with the left upper limit LUω and outputs the left upper limit LUω as a limited angular velocity correction value Δωa. Subsequently, the limiting processing of the angular velocity correction value Δω terminates.

In step S65, the limiting unit 204 determines whether or not the angular velocity correction value ΔΩ is less than the left lower limit LLω.

When the angular velocity correction value Δω is less than the left lower limit LLω (step S65: Yes), the process proceeds to step S66. When the angular velocity correction value Δω is not less than the left lower limit LLω (step S65: No), the process proceeds to step S67.

In step S66, the limiting unit 204 limits the angular velocity correction value Δω with the left lower limit LLω and outputs the left lower limit LLω as a limited angular velocity correction value Δωa. Subsequently, the limiting processing of the angular velocity correction value Δω terminates.

In step S67, the limiting unit 204 directly outputs the angular velocity correction value Δω without limitation as a limited angular velocity correction value Δωa. Subsequently, the limiting processing of the angular velocity correction value Δω terminates.

Advantageous Effects of Second Embodiment (1) The differentiator 62, the viscosity coefficient table 63, the multiplier 64, the conversion coefficient table 72, and the multiplier 73 calculate the angular velocity correction value Δω, based on the angular velocity ω of the first steering angle θs and the control angle θr. The correction value limiting unit 43 limits the angular velocity correction value Δω according to at least the steering state, the angular velocity ω of the first steering angle, and the first steering angle θs.

The turning angle control unit 34 includes the target angular velocity calculation unit 81 that calculates the target angular velocity ωr0, based on a difference between the corrected target steering angle θsr1 and the first steering angle θs, the subtracter 82 that corrects the target angular velocity ωr0 with the limited angular velocity correction value Δωa and thereby calculates the corrected target angular velocity ωr1, and the angular velocity control unit 85 that controls the turning motor 22 in such a way that the angular velocity ω coincides with the corrected target angular velocity ωr1.

In the turning control device that performs turning angle control of bringing the first steering angle θs close to a target steering angle and angular velocity control of bringing the angular velocity ω close to a target angular velocity, this configuration enables the target steering angle to be corrected according to the first steering angle θs and the target angular velocity to be corrected according to the angular velocity ω. Making the units of correction targets (that is, the target steering angle and the target angular velocity) the same as the units of correction amounts (that is, the steering angle correction value Δθ and the angular velocity correction value Δω) as described above causes handling of the steering angle correction value Δθ and the angular velocity correction value Δω used for correction to be facilitated.

Further, by the correction value limiting unit 43 limiting the steering angle correction value Δθ and the angular velocity correction value Δω, it is possible to suppress the minimum turning radius of the vehicle from becoming large and the handling of the vehicle from deteriorating and, in conjunction therewith, to achieve the end-abutting impact mitigation at a high level.

(2) The differentiator 62, the viscosity coefficient table 63, and the multiplier 64 calculate the viscous torque component (μ·ω) to be exerted on the turning mechanism, based on the control angle θr and the angular velocity ω. The conversion coefficient table 72 and the multiplier 73 convert the viscous torque component (μ·ω) to the angular velocity correction value Δω.

This configuration enables the angular velocity correction value Δω according to the angular velocity ω to be calculated based on the viscous torque component (μ·ω).

REFERENCE SIGNS LIST

1 Steering wheel
2 Steering shaft
3, 23 Reduction gear
4a, 4b Universal joint
5 Pinion rack mechanism
5a Pinion
5b Rack
6a, 6b Tie rod
7a, 7b Hub unit
8L, 8R Steered wheel
10 Torque sensor
11 Ignition (IGN) key
12 Vehicle speed sensor
13 Battery
14 Steering angle sensor
20 Backup clutch
21 Reaction force motor
22 Turning motor
24 Pinion
25 SBW-ECU
26 Turning angle sensor
30 Turning angle command value calculation unit
31 Control angle calculation unit
32 End-abutting impact mitigation control unit
33, 38, 80, 82, 86, 90 Subtracter
34 Turning angle control unit
35, 40 Current control unit
36, 41 PWM control unit
37, 42 Drive circuit
39 Reaction force control unit
51, 62, 66, 83, 201 Differentiator
43 Correction value limiting unit
50 Basic reaction torque calculation unit
52 Damping coefficient table
53, 55, 58, 61, 64, 68, 71, 73 Multiplier
54 Reaction force correction coefficient table
56, 69, 91 Adder
57 Turning ratio table
60 Spring constant table
63 Viscosity coefficient table
65 Sign determination unit
67 Inertia coefficient table
70, 72 Conversion coefficient table
81 Target angular velocity calculation unit
85 Angular velocity control unit
87, 89 Gain multiplication unit
88 Integrator
202 Steering state determination unit
203 Adjustment value setting unit
204 Limiting unit

The invention claimed is:

1. A turning control device comprising:
a turning angle sensor configured to detect a first steering angle of a turning mechanism;
a first actuator configured to drive the turning mechanism;
a steering angle sensor configured to detect a second steering angle of a steering mechanism; and
at least one processor configured to:
calculate a target steering angle of the turning mechanism, based on at least the second steering angle;
when a third steering angle, the third steering angle being either the first steering angle or the second steering angle, is in an angular range from a maximum steering angle that the third steering angle can take to a first threshold steering angle, calculate a steering angular displacement of the third steering angle with the first threshold steering angle used as a reference;
calculate a steering angle correction value according to at least the steering angular displacement;
determine whether a steering state is a state of a driver further turning a steering wheel or a state of the driver returning the steering wheel and limit the steering angle correction value according to at least the steering state, angular velocity of the third steering angle, and the third steering angle;
by correcting the target steering angle with the steering angle correction value limited by the at least one processor, calculate a corrected target steering angle; and
control the first actuator in such a way that the first steering angle coincides with the corrected target steering angle.

2. The turning control device according to claim 1, wherein
the at least one processor is further configured to:
calculate a torque including elastic torque based on the steering angular displacement as turning torque to be exerted on the turning mechanism; and
convert the turning torque to the steering angle correction value.

3. The turning control device according to claim 1, wherein
the at least one processor is further configured to:
calculate a torque including at least either elastic torque based on the steering angular displacement or viscous torque based on angular velocity of the first steering angle and the steering angular displacement as turning torque to be exerted on the turning mechanism; and
convert the turning torque to the steering angle correction value.

4. The turning control device according to claim 3, wherein
the at least one processor, by adding inertia torque based on angular acceleration of the first steering angle to at least either the elastic torque or the viscous torque, is configured to calculate the turning torque.

5. The turning control device according to claim 2, wherein
the at least one processor, by converting the turning torque, using a coefficient depending on vehicle speed, is further configured to calculate the steering angle correction value.

6. The turning control device according to claim 1, wherein the at least one processor is further configured to:
calculate an angular velocity correction value, based on angular velocity of the first steering angle and the steering angular displacement;
limit the angular velocity correction value according to at least the steering state, angular velocity of the third steering angle, and the third steering angle,
calculate a target angular velocity of the first steering angle, based on a difference between the corrected target steering angle and the first steering angle;
by correcting the target angular velocity with the angular velocity correction value limited by the at least one processor, calculate a corrected target angular velocity; and
control the first actuator in such a way that angular velocity of the first steering angle coincides with the corrected target angular velocity.

7. The turning control device according to claim 6, wherein
the at least one processor is further configured to:
calculate a viscous torque to be exerted on the turning mechanism, based on the steering angular displacement and angular velocity of the first steering angle; and
convert the viscous torque to the angular velocity correction value.

8. The turning control device according to claim 7, wherein
the at least one processor is further configured to convert the viscous torque to the angular velocity correction value, using a coefficient depending on at least either vehicle speed or whether a steering state is a state of a driver further turning a steering wheel or a state of the driver returning the steering wheel.

9. The turning control device according to claim 1 wherein the at least one processor is further configured to:
calculate a target reaction force to be applied to the steering mechanism, based on at least the second steering angle;
correct the target reaction force according to the steering angle correction value; and
apply reaction torque to the steering mechanism according to the target reaction force corrected by the at least one processor.

10. The turning control device according to claim 1, wherein
when the third steering angle exceeds a second threshold steering angle, the second threshold steering angle being larger than the first threshold steering angle, the at least one processor is further configued to alter the first threshold steering angle according to a difference between the third steering angle and the second threshold steering angle.

* * * * *